United States Patent
Rezgui et al.

(10) Patent No.: US 11,669,059 B2
(45) Date of Patent: Jun. 6, 2023

(54) AUTONOMOUS AND SEMANTIC OPTIMIZATION APPROACH FOR REAL-TIME PERFORMANCE MANAGEMENT IN A BUILT ENVIRONMENT

(71) Applicant: UNIVERSITY COLLEGE CARDIFF CONSULTANTS LIMITED (UC3), Cardiff (GB)

(72) Inventors: Yacine Rezgui, Cardiff (GB); Thomas Henry Outram Beach, Newport (GB); Ioan Petri, Cardiff (GB); Jean-Laurent Hippolyte, Cardiff (GB); Muhammad Waseem Ahmad, Cardiff (GB); Wanqing Zhao, Cardiff (GB); Shaun Howell, London (GB)

(73) Assignee: UNIVERSITY COLLEGE CARDIFF CONSULTANTS LIMITED (UC3), Cardiff (GB)

( * ) Notice: Subject to any disclaimer, the term of this patent is extended or adjusted under 35 U.S.C. 154(b) by 898 days.

(21) Appl. No.: 16/513,471

(22) Filed: Jul. 16, 2019

(65) Prior Publication Data
US 2021/0018881 A1 Jan. 21, 2021

(51) Int. Cl.
| | | |
|---|---|---|
| G05B 13/04 | (2006.01) | |
| G06N 20/00 | (2019.01) | |
| G06N 3/086 | (2023.01) | |
| F24F 11/50 | (2018.01) | |
| G06F 40/30 | (2020.01) | |

(52) U.S. Cl.
CPC .......... *G05B 13/041* (2013.01); *F24F 11/50* (2018.01); *G06F 40/30* (2020.01); *G06N 3/086* (2013.01); *G06N 20/00* (2019.01)

(58) Field of Classification Search
CPC ......... F24F 11/52; F24F 11/50; G05B 13/041; G06F 40/30; G06N 3/086
See application file for complete search history.

(56) References Cited

U.S. PATENT DOCUMENTS

| | | | |
|---|---|---|---|
| 8,204,903 B2* | 6/2012 | Bowers | G06F 16/284 707/739 |
| 10,162,850 B1* | 12/2018 | Jain | G06N 20/00 |
| 2011/0057929 A1* | 3/2011 | Chen | G06T 7/0006 345/419 |
| 2014/0148955 A1* | 5/2014 | Park | F24F 11/30 700/276 |
| 2017/0211837 A1* | 7/2017 | Gupta | G05D 23/1934 |

(Continued)

OTHER PUBLICATIONS

Moussas V.C. et al, "Design of an Ontology for Simulation Workflow Optimization", 5th International Conference on Experiments/Process/System Modeling/Simulation/Optimization, Athens, Jul. 3-6, 2013 (Year: 2013).*

(Continued)

*Primary Examiner* — Schyler S Sanks
(74) *Attorney, Agent, or Firm* — Dinsmore & Shohl LLP

(57) ABSTRACT

Certain aspects of the present disclosure provide techniques for semantically contextualizing structured and unstructured data, extracting and making sense of domain knowledge, and performing semantic-driven optimization to provide generic, scalable, autonomous and real-time performance management within a built environment domain.

20 Claims, 21 Drawing Sheets

(56) References Cited

U.S. PATENT DOCUMENTS

2019/0121801 A1* 4/2019 Jethwa ................. G06F 16/243

OTHER PUBLICATIONS

Mason-Jones, Rachel et al., "Total cycle time compression and the agile supply chain", International Journal of Production Economics, 1999, vol. 62, pp. 61-73.

Lord, Phillip, "The Semantic Web takes Wing: Programming Ontologies with Tawny-OWL", in Proc. of the 10th International Workshop on OWL: Experiences and Directions (OWLED 2013) Co-located with 10th Extended Semantic Web Conference (ESWC 201), May 2013, vol. 1080, Montpellier, France.

Zhdanova, Anna V. et al., "Choosing an Ontology Language", WASET, International Journal of Computer, Electrical, Automation, Control and Information Engineering, 2007, vol. 1, No. 4, pp. 996-999.

Luo, Xiangfeng et al., "Building Association Link Network for Semantic Link on Web Resources," IEEE Transactions on Automation Science and Engineering, Jul. 2011, vol. 8, No. 3, pp. 482-494.

Zakova, Monika et al., "Automating Knowledge Discovery Workflow Composition Through Ontology-Based Planning," IEEE Transactions on Automation Science and Engineering, Apr. 2011, vol. 8, No. 2, pp. 253-264.

Gao, Yang et al., "Using Data Mining in Optimisation of Building Energy Consumption and Thermal Comfort Management", in Proc. IEEE 2nd International Conference on Software Engineering and Data Mining (SEDM), Jun. 2010, pp. 434-439, Chengdu, China.

Quinlan, J.R., "Decision Trees and Decisionmaking", IEEE Transactions on Systems, Man and Cybernetics, Mar./Apr. 1990, vol. 20, No. 2, pp. 339-346.

Setiono, Rudy et al., "Extraction of Rules From Artificial Neural Networks for Nonlinear Regression," IEEE Transactions on Neural Networks, May 2002, vol. 13, No. 3, pp. 564-577.

Pham, D.T. et al., "A rule merging technique for handling noise in inductive learning", Proceedings of the Institution of Mechanical Engineers, Part C: Journal of Mechanical Engineering Science, Jun. 2004, vol. 218, pp. 1255-1268.

Pham, D.T. et al., "RULES-6: A Simple Rule Induction Algorithm for Supporting Decision Making", in Proc. IEEE Industrial Electronics Society Conference (IECON), Nov. 2005, pp. 2184-2189.

Niu, Jianwei et al., "A Comparative Study on Application of Data Mining Technique in Human Shape Clustering: Principal Component Analysis vs. Factor Analysis", in Proc. IEEE 5th Industrial Electronics and Applications (ICIEA) Conference, Jun. 2010, pp. 2014-2018, Taichung, Taiwan.

Rabunal, Juan R. et al., "A New Approach to the Extraction of ANN Rules and to Their Generalization Capacity Through GP", Neural Computation, 2004, vol. 16, No. 7, pp. 1483-1523.

Pal, Nikhil R. et al., "Fuzzy Rule Extraction From ID3-Type Decision Trees for Real Data", IEEE Transactions on Systems, Man, and Cybernetics, Part B: Cybernetics, Oct. 2001, vol. 31, No. 5, pp. 745-754.

Duc, Wlodzislaw et al., "A New Methodology of Extraction, Optimization and Application of Crisp and Fuzzy Logical Rules," IEEE Transactions on Neural Networks, Mar. 2001, vol. 12, No. 2, pp. 277-306.

Ponni, J. et al., "Multi-Agent System for Data Classification from Data Mining using SVM", in Proc. IEEE 5th Green Computing, Communication and Conservation of Energy (ICGCE) Conference, Dec. 2013, pp. 828-832, Chennai, India.

Manson, Steven M., "Simplifying Complexity: a review of complexity theory", 2001, Geoforum, vol. 32, No. 3, pp. 405-414.

Mingers, John et al., "A review of the recent contribution of systems thinking to operational research and management science", European Journal of Operational Research, 2010, vol. 207, No. 3, pp. 1147-1161.

Petri, Ioan et al., "A modular optimisation model for reducing energy consumption in large scale building facilities", Renewable and Sustainable Energy Reviews, 2014, vol. 38, pp. 990-1002.

DesignBuilder, Design-Builder Software Ltd, https://www.designbuilder.co.uk/, accessed Aug. 21, 2017.

Virtual Environment (VE) by Integrated Environmental Solutions (IES), Integrated Environmental Solutions Limited, https://www.iesve.com/, accessed Aug. 21, 2017.

Howell, Shaun et al., "Integrating building and urban semantics to empower smart water solutions", Automation in Construction, 2017, vol. 81, pp. 434-448.

SparQL Query Language for RDF, W3C, https://www.w3.org/TR/rdf-sparql-query/, accessed Aug. 21, 2017.

* cited by examiner

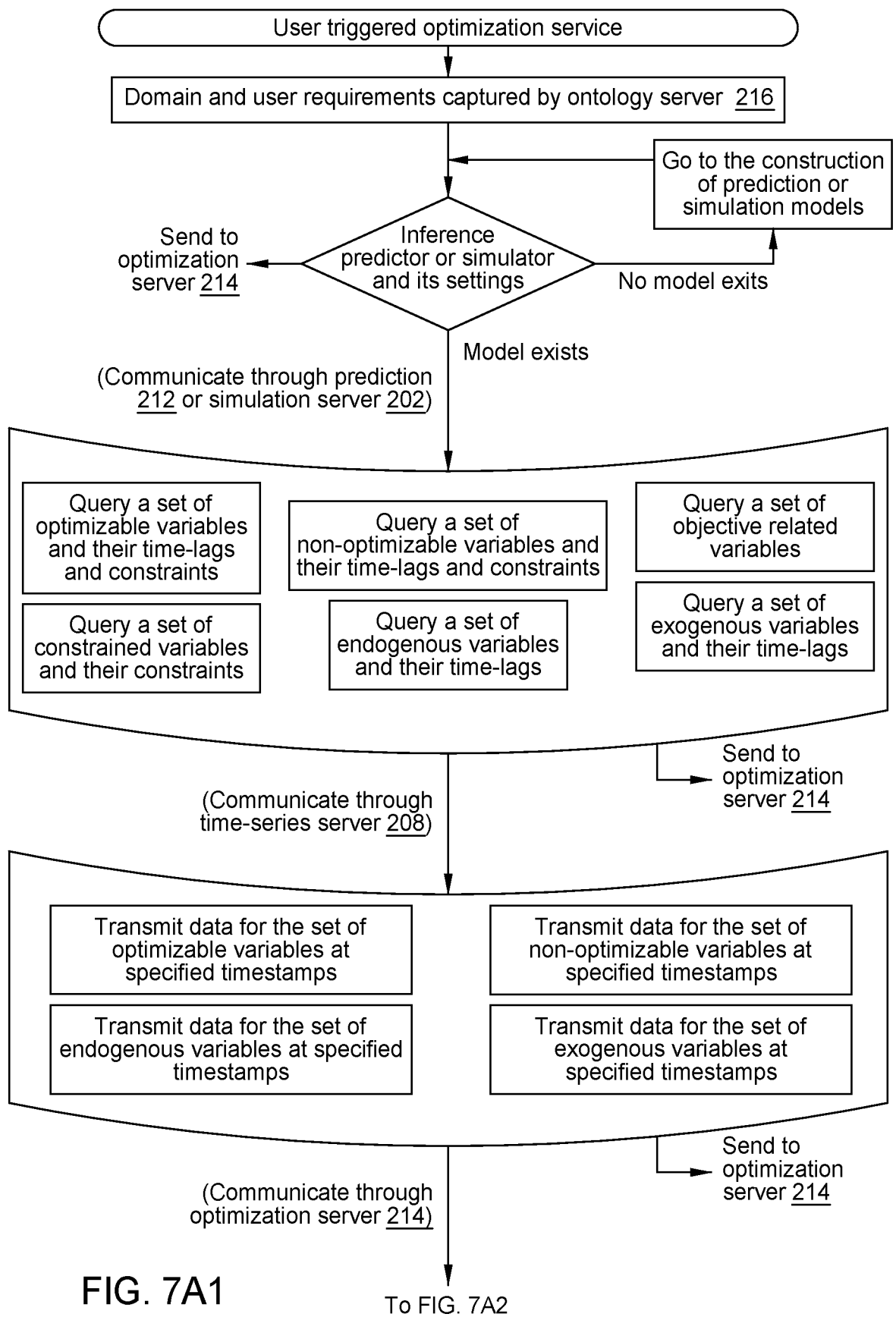
FIG. 7A1
To FIG. 7A2

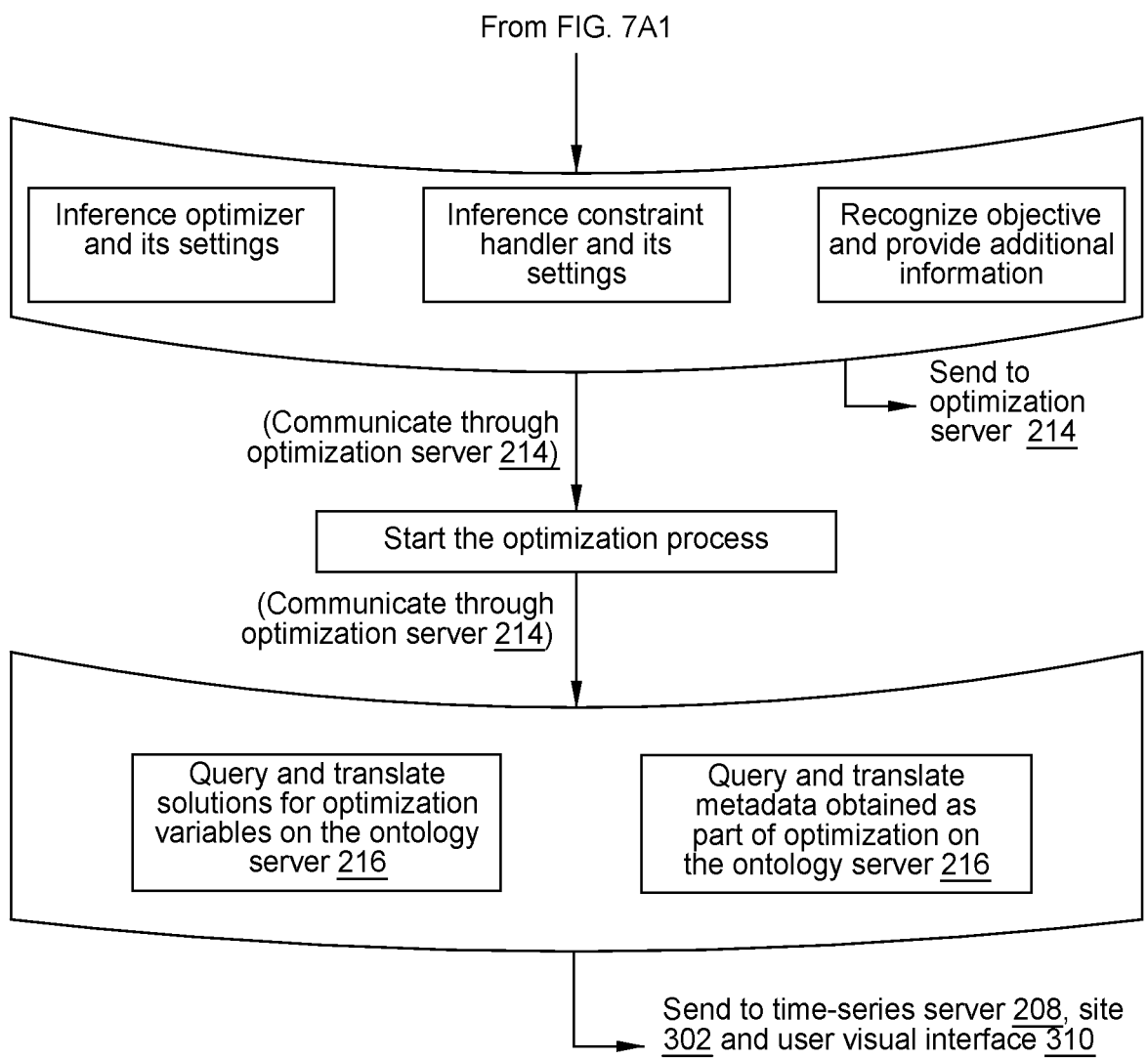
FIG. 7A2

User actuated optimization service

1. Minimize energy consumption
2. Maintaining thermal and visual comfort and indoor air quality

Semantics Problem Interpretation for thermal scheduling

| Objective formulation | Optimization variable specification | Constraint retrieval | Physical simulation model or prediction model calibration or construction | Endogenous state transmission | Exogenous input transmission |
|---|---|---|---|---|---|
| 1. Minimize HVAC energy consumption | 1. Window blind position<br>2. Heat recovery unit operation<br>3. Window opening | 1. Carbon dioxide concentration <1000 ppm<br>2. Illuminance level [300-500] lx<br>3. Indoor air temperature [21-23] °C | 1. Thermal dynamic simulation model<br>2. Lighting simulation model<br>3. Machine learning model | 1. Time<br>2. Occupancy<br>3. Indoor air temperature<br>4. Indoor air humidity<br>5. Indoor daylight illuminance | 1. Carbon dioxide concentration<br>2. Illuminance level<br>3. Indoor air temperature |

Semantics Optimization for thermal scheduling

| Optimized determination based on the registered algorithms | Algorithmic setting configuration | Optimization task actuation | Timing and performance control |
|---|---|---|---|
| 1. NSGA II | 1. Mutation rate = 0.3<br>2. Crossover = 0.5<br>3. Population size = 1000 | 1. Window blind position setpoint<br>2. Heat recovery unit setpoint<br>3. Window opening setpoint | 1. Controlling interval = 15 min |

FIG. 10

AUTONOMOUS AND SEMANTIC OPTIMIZATION APPROACH FOR REAL-TIME PERFORMANCE MANAGEMENT IN A BUILT ENVIRONMENT

INTRODUCTION

Aspects of the present disclosure relate to systems and methods for semantically contextualizing structured and unstructured data, extracting and making sense of domain knowledge, and performing semantic-driven optimization to provide generic, scalable, autonomous, and real-time performance management within a built environment domain.

Conventional approaches to management of a phenomenon (e.g., energy use) in a built environment (e.g., a building, group of buildings, city, etc.) often involve meeting several performance criteria related to several constituent sub-systems of the built environment, such as may be described by a set of performance functions. Each performance function generally corresponds to one requirement and is constructed on the basis of mathematical models describing the target phenomenon under investigation. In some cases, these requirements are formulated in the form of range values (upper and lower limit) to be satisfied. When outside the specified ranges, the management system becomes unfit for purpose and may cause all sorts of malfunctions. Further, many model parameters are time-dependent and subject to variation and change. Thus, the complex interplay between the variables that govern a phenomenon precludes a simple set of rules or guidelines and necessitates the development of more complex data-rich models that (a) better inform about the right optimization strategy and (b) devise appropriate (near) real-time response to unexpected changes in system behavior with respect to the phenomenon.

For example, in sports facilities, the problem of energy optimization is complex due to the large number of parameters that need to be modelled and assessed, such as related to HVAC (heating, ventilation, air conditioning) systems, lighting, security, networking, and the like. Intelligent optimization methods in sport facilities are desirable in order to improve overall operation and to achieve energy savings. Conventional optimization techniques have relied on human intervention, such as behavior rules and best practices, but have never achieved the intelligence to achieve truly optimal energy management based on the vast amount of data available. Rather, conventional optimization methods focus on facility specific information coupled with best practices applicable only for pre-determined energy objectives for that specific facility. The conventional optimization models rarely take advantage of the wide-range of data available and require expert intervention to design, train, and deploy.

Accordingly, what is needed are systems and methods to enable performing semantic optimization for real-time performance management without the need for expert intervention.

BRIEF SUMMARY

Certain embodiments provide a method for user-actuated optimization of a built environment scenario, comprising: receiving, from a user, an optimization objective associated with a built environment; performing semantic problem interpretation based on the optimization objective; performing semantic optimization for the optimization objective; and providing an optimization output to the user.

Certain embodiments provide a method for providing performance management in a built environment, comprising: retrieving a semantic domain model of a built environment; rendering a three-dimensional model of the built environment in a graphical user interface based on the semantic domain model of the built environment; receiving, via the graphical user interface, a selection of an element of the three-dimensional model; and rendering, within the graphical user interface, a consumption view comprising consumption data related to the selected element of the three-dimensional model.

Certain embodiments provide a method for providing performance management in a built environment, comprising: retrieving a semantic domain model of a built environment; receiving, via a graphical user interface, an optimization scenario comprising one or more optimization features in a natural language format; constructing, based on the optimization scenario, one or more machine learning models; selecting an optimization algorithm based on the one or more machine learning models; and providing, via the graphical user interface, an optimization output.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 7A1 and 7A2 depict an example flow for a semantic-driven optimization service.

FIG. 10 depicts an example of the semantic interpretation for scheduling strategy for enhancing thermal, visual, and internal air quality comfort.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
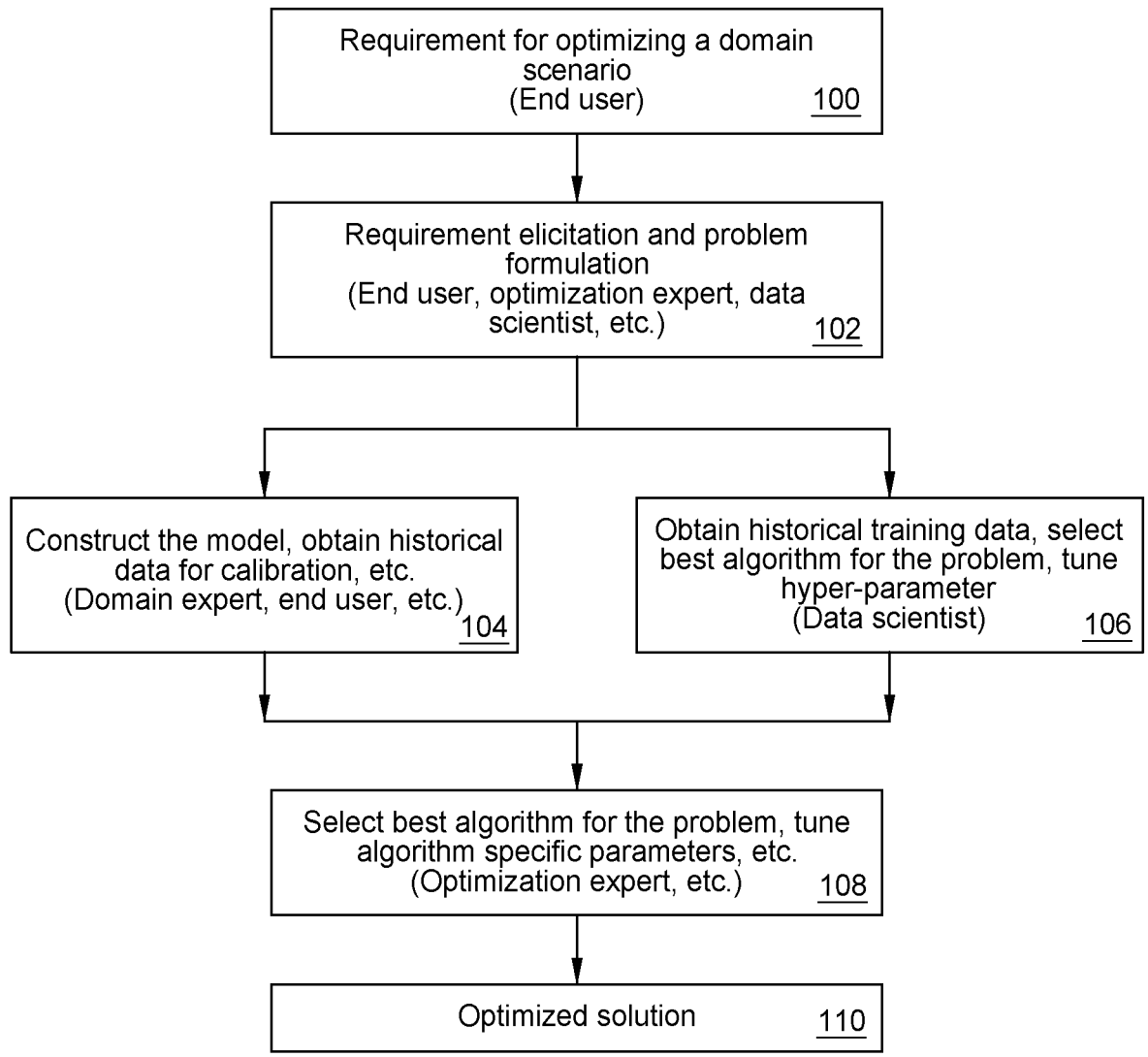
FIG. 1 depicts the abstracted prior art approach for performing optimization, prediction and simulation services.

Aspects of the present disclosure provide apparatuses, methods, processing systems, and computer readable mediums for performing semantic optimization for real-time performance management.

The systems and methods described herein are applicable to data-intensive problems or scenarios within a built environment. Generally, a built environment refers to any sort of environment built by humans and including physical artefacts, such as buildings, roads, infrastructure, and other non-naturally occurring things. For example, a house is a physical artefact in a city, which is a built environment.

Built environments are becoming increasingly digital and even "smart" based on the incorporation of, for example, sensing and actuation elements, such as found in the so-called Internet of Things or Connected Objects field. The Internet of Things may be described as a technology stack including, for example, device hardware, device software, communications, cloud platforms, and cloud applications.

The systems and methods described herein provide a scalable and self-updatable approach for continuously optimizing the performance of aspects of built environments, such as energy use, water use, air quality, comfort, and other phenomena, without expert intervention. To do so, systems and methods described herein consume real-time data regarding the built environments, such as provided by sensors, actuators, switches, and the like, placed throughout the built environment. Moreover, optimization of such built environments may be initiated via natural language instructions provided by non-expert end users.

Systems within built environments may interact according to complex patterns, and the understanding of these patterns and behavior may best be approached by adopting a holistic and multi-aspect view of the phenomena as opposed to focusing on analyzing constituent components individually. Thus, an uncoordinated approach may be replaced by a framework in which the identities of separate parts of the system are subsumed by the identity of the total system characterizing the phenomenon under investigation. In one implementation, this characterization may be achieved through the use of ontologies.

An ontology is a computer and human readable conceptualization of a domain whereby knowledge is represented as sets of semantically related concepts through classes, their properties, and their relationships. Ontologies have been developed and are particularly useful in, for example, the building and infrastructure domains. Ontologies may beneficially identify and conceptualize underpinning domain artefacts, such as aspects of a building including layout, floors, size, pints of ingress and egress, build materials, window and door locations, systems (e.g., plumbing, electric, HVAC, security, networking), and myriad other aspects.

Popular ontology development languages include RDF (Resource Description Framework), RDF Schema and OWL (Web Ontology Language). RDF graphs define the types and properties of resources and can be used for a wide range of applications. RDF Schema extends RDF with mechanisms to represent domain-specific semantics. However, RDF vocabularies generally lack reasoning capability. Conversely, OWL is designed to describe the structure of a domain with expressive first order logic constructs. Thus, OWL is generally better adapted for automated reasoning. However, both RDF and OWL are limited in the way they handle rules. Several rule extension frameworks have been proposed to address this limitation, including N3 and SWRL.

A challenge arises when developing rules from several heterogeneous data sources and/or without domain expert knowledge. However, data mining algorithms are capable of performing association, cluster generation, and knowledge derivation using a large number of variables and datasets, and thus are useful in addressing this challenge. For example, several data mining techniques have been developed to generate rules using classification and feature extraction methods such as decision trees, artificial neural networks, inductive learning and rule family, principal components analysis, artificial neural network-genetic algorithm, fuzz systems, neuro-fuzzy systems, and support vector machines, to name a few.

A "system thinking" perspective is useful for optimizing the performance of various phenomena in built environments (and other systems) as it provides a foundation for the modelling of the phenomena necessary to understand how the different components within the built environment interact, the involved variables, their dependencies, and the dynamic forces that affect their performance. As such, the individual systems, subsystems and components that characterize a phenomenon within a built environment may be optimized to achieve an overall functional and performance driven objective under a number of constraints.

The system thinking approach is consistent with complexity research that contends that systems have emergent or synergistic characteristics that are difficult to understand without reference to sub-systems relationships. System thinking approaches may be characterized by: viewing a situation holistically, as opposed to reductionistically, as a set of diverse interacting elements within an environment; recognizing that the relationships or interactions between elements are more important than the elements themselves in determining the behavior of the system (e.g., of or within a built environment); recognizing a hierarchy of levels of systems and the consequent ideas of properties emerging at different levels, and mutual causality both within and between levels; and accepting, especially in social systems, that people will act in accordance with differing purposes or rationalities.

Conventional Problem Optimization Approach

FIG. 1 depicts a flow chart for optimizing a process in a built environment domain. In particular, FIG. 1 shows the human involvement at different stages of the process. Human involvement may include different types of actors, such as: a domain expert, which has specialist knowledge and dedicated expertise to address and resolve domain problems within his/her own area of competency in a built environment domain; a system expert, which has advanced knowledge on computer systems with a wide range of competencies, including software configuration, software programming and knowledge engineering; and a non-expert end-user, which is a human user with no or little domain (i.e. built environment) expertise.

Initially, at step 100, a non-expert end-user raises an optimization task for a particular problem or scenario of interest.

At step 102, all involved users (including non-expert end-users, domain experts, and system experts (e.g., an optimization expert or data science expert) formulate the problem and also capture the necessary requirements from the domain. Based on whether there is a requirement to develop a simulation model (a model based on first principles) or a predictive model (a data-driven model), step 104 or step 106 is correspondingly completed.

In order to develop a simulation model as shown in step 104, a domain expert may generally collect all the necessary information, including drawings, operation manuals and historical data to develop and calibrate an appropriate simulation model.

Alternatively, a data scientist may be involved in step 106 to develop a machine learning model, which could also be used as an evaluation engine for an optimization algorithm. The data scientist generally has to select the best suited algorithm for the problem, obtain a historical dataset for training a model, and choose optimal hyper-parameters for the selected algorithm.

Once the model is developed, an optimization expert is involved in step 108 to select the best algorithm for the given problem along with tuning algorithm-specific parameters.

Once this is completed at step 110, the optimization process can be started in order to obtain optimized control strategies.

As demonstrated in FIG. 1, experts play a significant role in conventional methods for solving optimization tasks.

Given the limitations of the conventional practice of domain-specific designated optimization tasks as discussed above, there is a need for a generic data-oriented and expert-free optimization system that can be readily linked to different applications within the built environment domain for providing systematic and autonomous solutions to specific problems and scenarios. As opposed to the traditional concept of semantic optimization, which relies on optimizing semantics (e.g., semantic search), the systems and methods described herein provide a data-intensive system gaining and exploiting the semantic understanding of the domain to ultimately inform the optimization process coupled with simulation and prediction functionalities. Moreover, the systems and methods described herein minimize or completely eliminate the involvement of domain and system experts, which improves the overall optimization performance and reduces the associated product development cost.

Semantic-Driven Performance Management System Overview

The systems and methods described herein combine problem and scenario optimization with a simulation and prediction capability generally without the need for expert intervention or involvement. These systems and methods may be used, for example, within the built environment domains (e.g., buildings, water infrastructure, power infrastructure, network infrastructure, etc.). The systems and methods described herein overcome the conventional need for significant expert involvement and provides a generic, scalable, and autonomous solution, which may be referred to as semantic-driven performance management, to address a wide variety of domain problems or scenarios.

Systems and methods described herein may utilize a conceptualization of a domain (including the physical and non-physical artefacts, field sensors, actuators, etc.) under investigation and the advanced information and communication technologies (including optimization, prediction, simulation, data storage and transmission, and information management) in artificial intelligence, decision support science, and complex systems.

Figure 2:
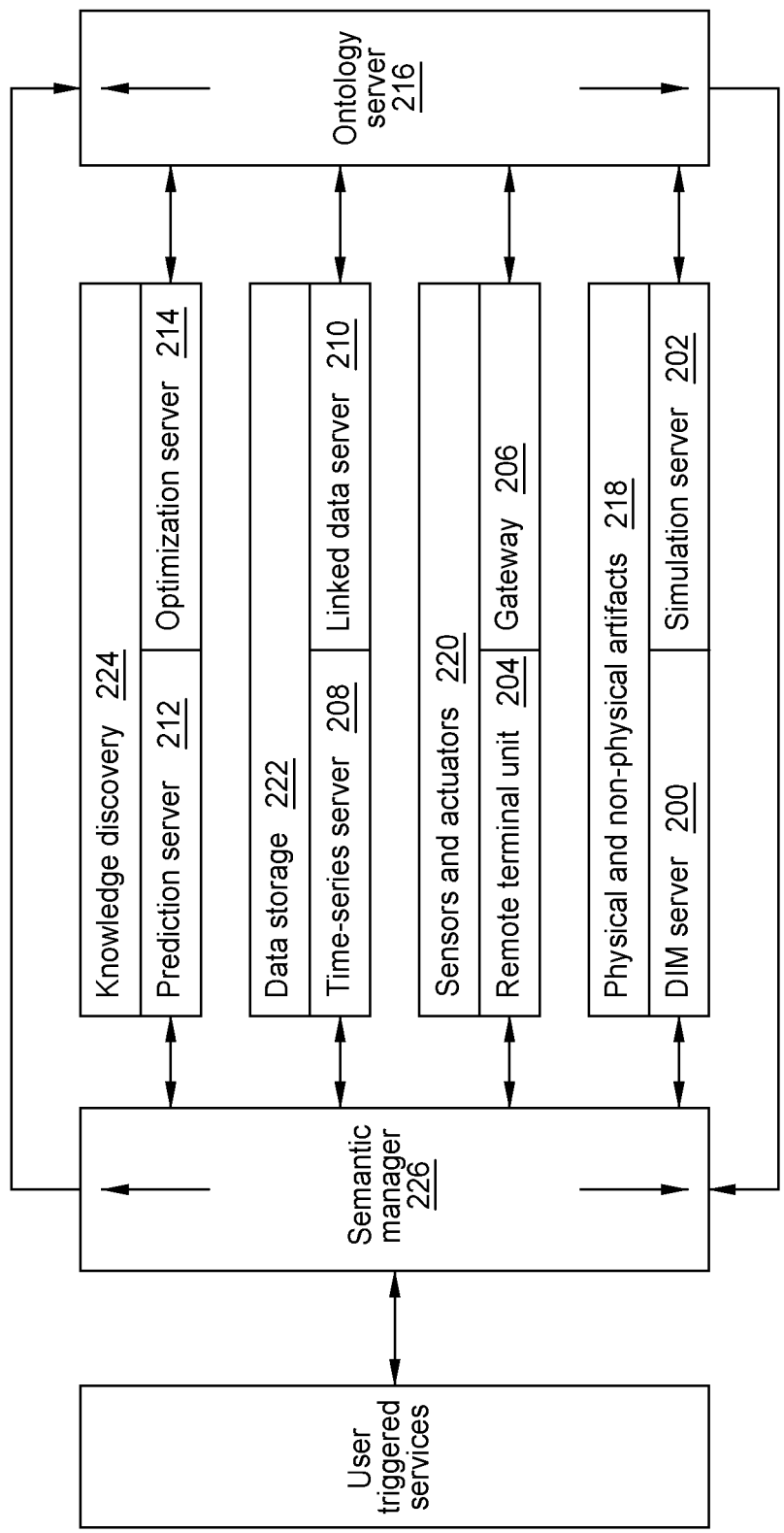
FIG. 2 depicts an overview of an example system according to embodiments described herein.

FIG. 2 depicts a general overview of one embodiment of a semantic performance management system architecture 200 according to one embodiment.

In the depicted embodiment, the semantic performance management system 200 is structured logically into four layers, including: physical and non-physical artefacts 218, sensors and actuators 220, data storage 222, and knowledge discovery 224.

The first layer 218 provides a repository for physical and non-physical artefacts data, which describe the physical and non-physical objects of a domain captured by semantic domain models hosted in DIM (Domain Information Modelling) server 200 and in simulation models hosted in the simulation server 202 for subsequent performance analysis.

For example, physical artefacts may include physical features of a building, such as size, location, number and placement of doors, number and placement of windows, types of sub-systems (e.g., HVAC), type of build materials, and many others. Non-physical artefacts may include, for example, historical data regarding operation of the building (e.g., power usage, water usage, occupancy, etc.), qualitative data, such as user experiences with a building provided by survey evidence, ownership and management information, and others.

The simulation server 202 is configured to host domain-oriented knowledge models based on first principles and to provide a simulation capability that can be exploited by other components of the system depicted in FIG. 2. In some embodiments, the simulation server 202 is configured to interface with commercial and open access simulation environments, such as EnergyPlus, Simulink, Epanet and Transys, to name a few.

Further, the simulation server 202 is configured to orchestrate the calibration of the hosted domain models using historical and real-time data sources. Being complementary to the numerical-based simulation server 202, the DIM server 200 additionally enables manipulation (storage, query and extraction) of the semantic information regarding physical and non-physical artefacts of the domain.

The second layer 220, includes any sensors and actuators, such as may be accessed via the remote terminal unit 204 and gateway 206.

The remote terminal unit 204 and the gateway 206 in general serve as the localized wired and wireless medium (hardware and/or software) to relay data between the site and the system described herein, including collecting monitored data from the site and transmitting it to the system and collecting predictions and actuations from the system and transmitting it to the field.

The third layer 222 is the data storage layer, which in this embodiment includes a time-series server 208 and linked data server 210.

The time series server 208 is configured to record sensor readings, actuation events, and any other system generated data in order to achieve an accurate understanding of the current and historical states of a phenomenon or domain scenario under consideration. The time-series server 208 then provides means for consistently storing, replicating and manipulating both the site and the system generated data for the static or time-dependent dynamic representation of the artefacts involved in the domain and the system under consideration, including the historical and current semantic information of the artefacts, monitored data, predicted data and optimized actuation signals.

The time-series server 208 is also configured to record any detected variations on the ontology server 216, which holds a semantic-web based conceptualization of the current state of the domain and the system using a set of ontologies.

The linked data server 210 is configured to retrieve data from external services and thus facilitate data sharing and contextualization by annotating and referencing with existing standards, such as URIs (Uniform Resource Identifiers) and RDF (Resource Description Framework).

The fourth layer is the knowledge discovery layer 224, which in this embodiment includes a prediction server 212 and an optimization server 214.

Prediction server 212 is configured to infer new knowledge about a phenomenon or domain scenario by delivering automated prediction and optimization solutions. Thus, the prediction server 212 supports the development of data-driven predictive models, including a wide range of machine learning techniques, such as artificial neural networks, fuzzy systems and support vector machines.

For example, prediction server 212 may be configured to recognize patterns based on historical data stored on the time-series server 208. The patterns may be used by predictive models hosted by prediction server 212 to predict trends and to assist in the process of optimization, which may be performed by a wide range of metaheuristics (such as genetic algorithms, particle swarm optimization and differential evolution) hosted by the optimization server 214. Metaheuristics are generic approximate optimization methods that are able to solve hard problems in a reasonable time without any knowledge of the analytical expressions of the constraints and objective functions. They are therefore well suited to semantic-based optimization problem configuration and data-driven (predictive or simulated) evaluation of candidate solutions. Optimization server 214 may be used in conjunction with simulation server 202 to pursue such performance gap reduction depending on the timing requirements imposed by the domain (as this would may lead to high computational demand as a result of the heavy first-principles-based calculations).

Semantic manager 226 provides the interface that aligns the aforementioned system components. The semantic manager monitors sensor data and the activity of all system components. It then orchestrates actions of other system components based on this activity. Examples of this include; (a) the semantic manager triggering the prediction server to construct a new data driven model as a consequence of the addition of a new sensor and (b) the semantic manager triggering the optimization server as a result of a specific rule being met, i.e. energy usage exceeding the average measure.

Ontology server 216 is configured to conceptualize all the servers and elements 200-214 within the architecture 200 to enable autonomous inferencing through the semantic manager 226 without expert intervention.

In particular, ontology server 216 contains a set of ontologies developed across the four different layers to model all components therein and to enable interaction between the layers for semantic inferencing as coordinated through semantic manager 226.

For example, every entity (e.g. an actuation variable or an optimization algorithm) within one of the aforementioned components is first registered with and modelled by a corresponding ontology at that layer and then for use in the future inferencing process.

Ontology server 216 and DIM server 200 collectively enable a non-expert end-user to modify various aspects of system 200 without requiring a domain and/or system expert. By modelling all data in the domain being considered, such as depicted for example in FIGS. 3A-3C, ontology server 216 and DIM server 200 provide an explicit mapping between data, how it is collected, how it is simulated, how it is predicted, and the physical space from which it originates. This explicit mapping then governs how new data is stored in a standard sequential or time-series format. Non-expert end-users can then utilize the mappings to locate and view any item of, for example, monitored, simulated, or expected data. For example, a non-expert end-user may identify the desired data items from their physical location, using the ontology, and then locate the data within the storage system based on an associated mapping.

Figure 3A:
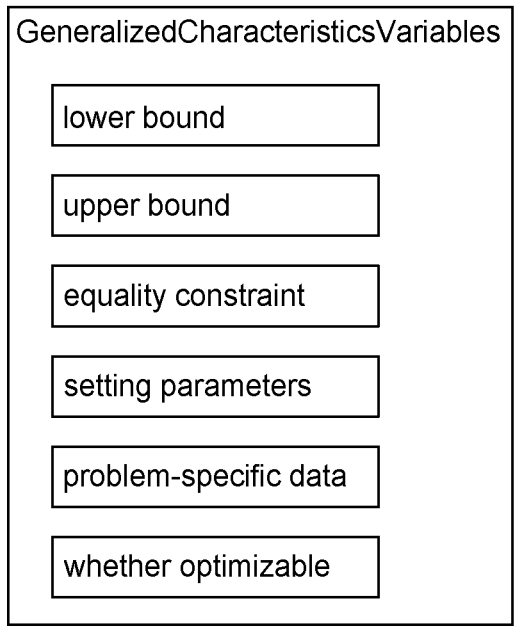
FIG. 3A depicts an example of a generalized characteristics representation for a variable entity.
Figure 3B:
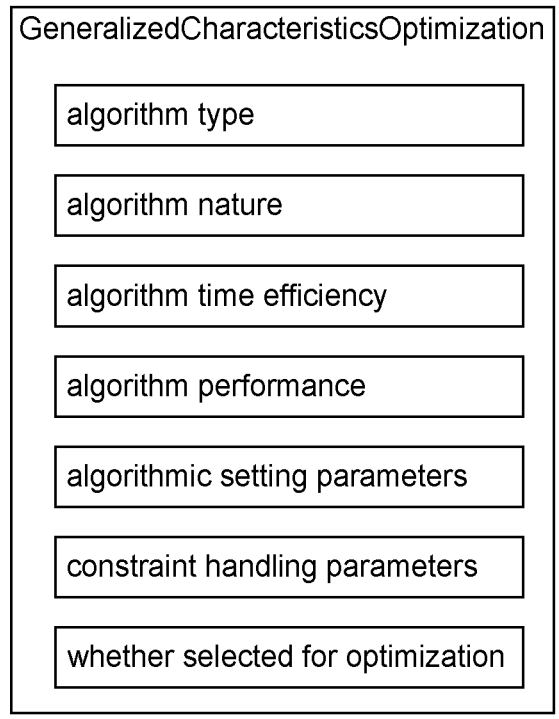
FIG. 3B depicts an example of a generalized characteristics representation for an optimization entity.
Figure 3C:
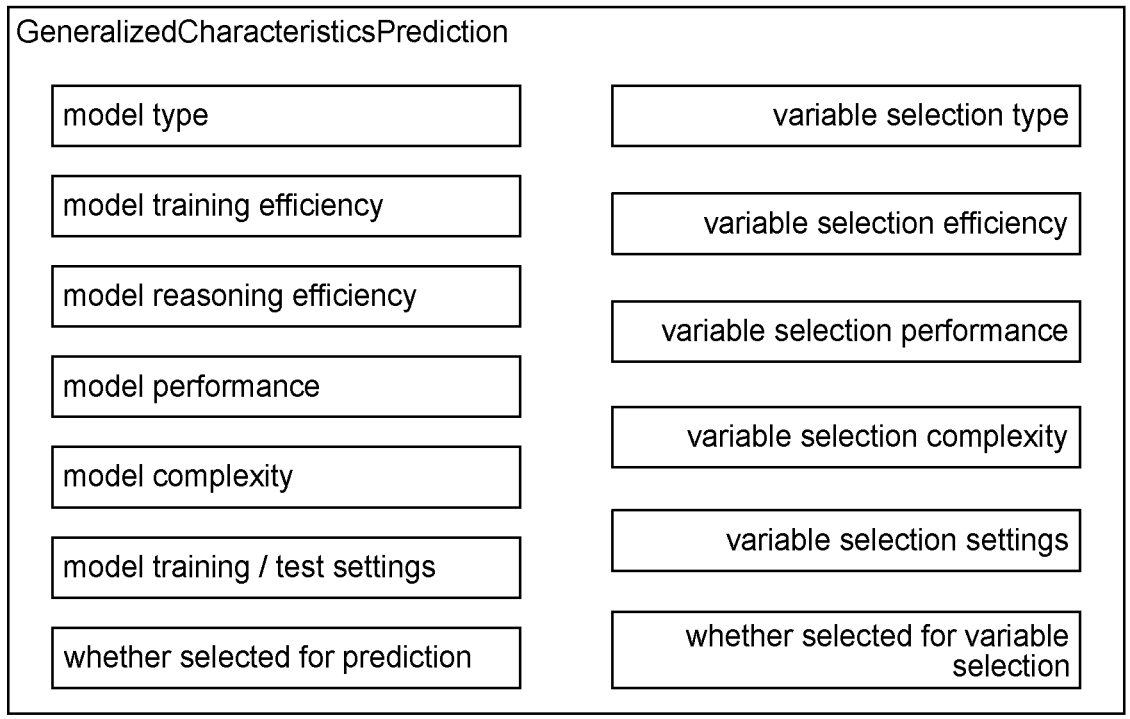
FIG. 3C depicts an example of a generalized characteristics representation for a prediction entity.

To facilitate various types of information management based on ontologies, FIGS. 3A-3C depict a concept of generalized characteristics representations that may be used by every entity across system 200, including the variables (see FIG. 3A) modelled at different scales within artefact, sensor/actuator and data storage layers, and the optimization (see FIG. 3B) and prediction (see FIG. 3C) algorithms modelled within the knowledge discovery layer 224.

Within this generalized characteristics representation, a number of fields are defined in FIGS. 3A-3C in order to capture the key features and requirements of the entities related to a domain or a system under consideration.

For example, as shown in FIG. 3A, an actuator or a process variable may be associated with a lower or upper bound, or a discrete set of values, which are allowed for the actual implementation of the system given the domain or end-user requirements. FIG. 3A further depicts setting parameters, problem-specific data, and an indication of whether the variable is optimizable. Notably, this is just one example, and many other are possible.

In another example shown in FIG. 3B, the features of an optimization algorithm may include the type (i.e. continuous, discrete and mixed-integer), nature (i.e. single-objective and multi-objective), time efficiency, performance and setting parameters. Further, FIG. 3B depicts an indication of whether the particular algorithm is selected for optimization. Thus, the optimization algorithm is conceptually modelled by the ontology server 216. Here again, this is just one example, and many other are possible.

In yet another example shown in FIG. 3C, the features of a prediction algorithm may be modeled using a generalized characteristic representation. In this example, aspects such as model type, model training efficiency, model reasoning efficiency, model performance, model complexity, model training and test settings, variable selection type, variable selection efficiency, variable selection performance, variable selection complexity, and variable selection settings are included in the representation along with an indication of whether the prediction algorithm is selected for prediction or for variable selection.

More generally, the concept of generalized characteristics representation can be implemented by defining several classes describing the blueprints of a given concept and then constructing the corresponding object (instance of classes) to be associated with each entity of a system. For a particular entity, only relevant fields of an object need be filled and a consistency check may then be carried out to ensure their correctness. For example, a process variable may be limited to including a lower bound and an upper bound, or one or more equality constraints.

Returning to FIG. 2, with the aid of ontological representations of all the entities and components of a system, the semantic manager 226 translates various scenarios, specified by non-expert end-users, to machine-understandable tasks. For example, scenarios with associated objectives and control strategies may be specified, without domain and/or system expert involvement, through structured natural language statements.

An example of a structured natural language statement is:

<activity><spatial location><variable>[target]

In the example, above, <activity> represents what action is required (e.g., maintain, reduce, increase), <spatial location> is the spatial location being considered (e.g., building name/room number), <variable> is the variable being considered (e.g., temperature, energy use), and [target] is optional and allows the specification of a desired value for the variable.

Such natural language statements can be interpreted based on the terminologies conceptualized within the ontology and can thus facilitate the translation of non-expert end-user inputs into system settings. Further, the links modelled in the ontology can be followed to construct actionable objectives and to locate the information needed for their calculation.

Semantic manager 226 orchestrates these tasks by allocating them for execution to the appropriate servers in one or several of the four layers of system 200, while also sending the results back to the user interface (e.g., for viewing by non-expert end-users) or the field where appropriate.

Notably, the various "servers" in FIG. 2 need not be implemented in separate physical devices (e.g., separate computer servers), and can instead correspond to services running on one or more computing devices, including cloud computing resources. In some cases, individual servers or services (e.g., prediction, optimization, and simulation) may run on several computing devices at once. Similarly, the various "layers" depicted in FIG. 2 may exist in other configurations in other embodiments, and more or fewer layers may be present in such embodiments.

Realization of Semantic-Driven Prediction Services

Figure 4:
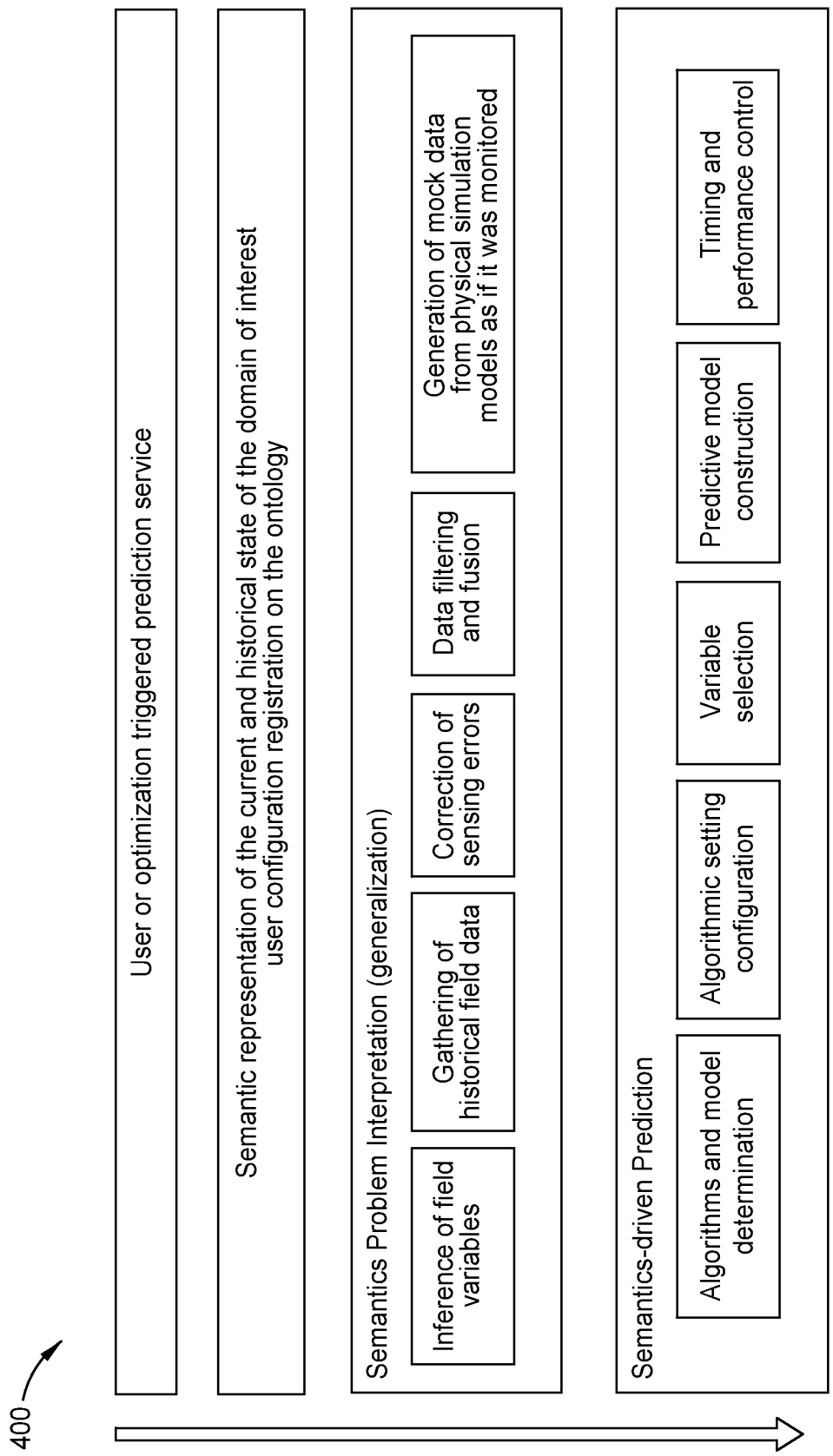
FIG. 4 depicts an example of a layered structure of a semantic-driven prediction service.
Figure 5A:
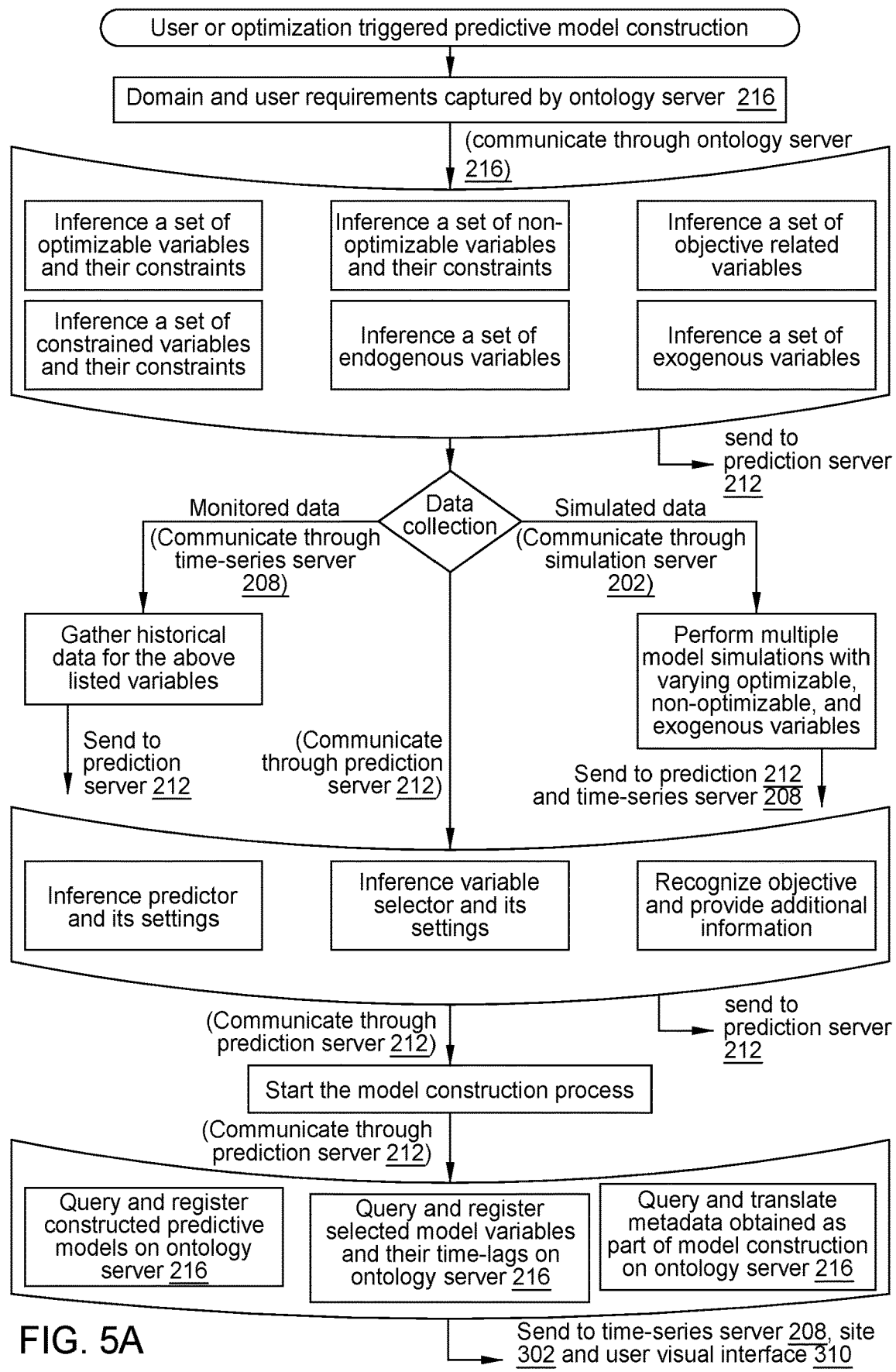
FIG. 5A depicts an example flow for a semantic-driven prediction service.
Figure 5B:
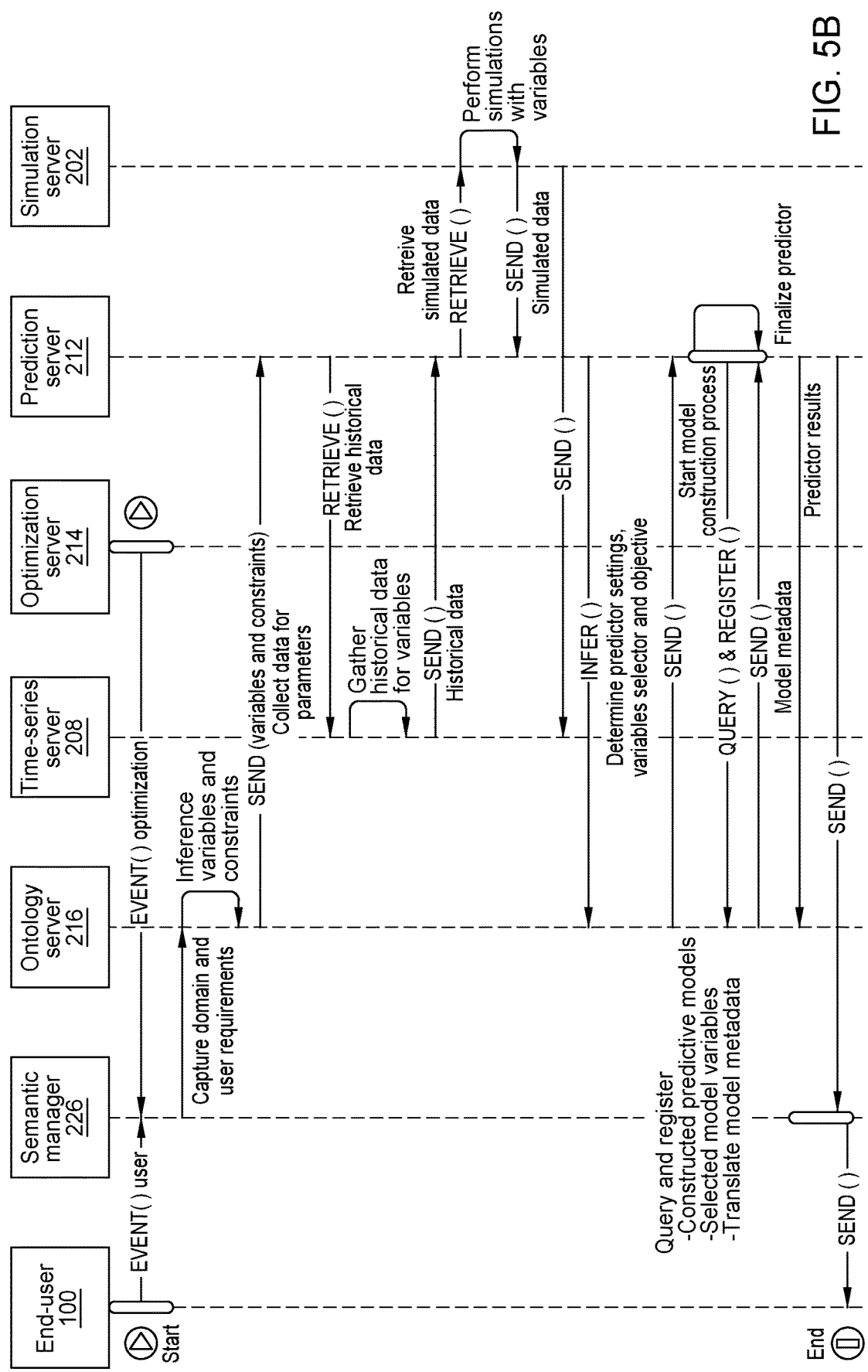
FIG. 5B depicts an example of the direct interaction between various system elements to implement a semantic-driven prediction service.
Figure 6:
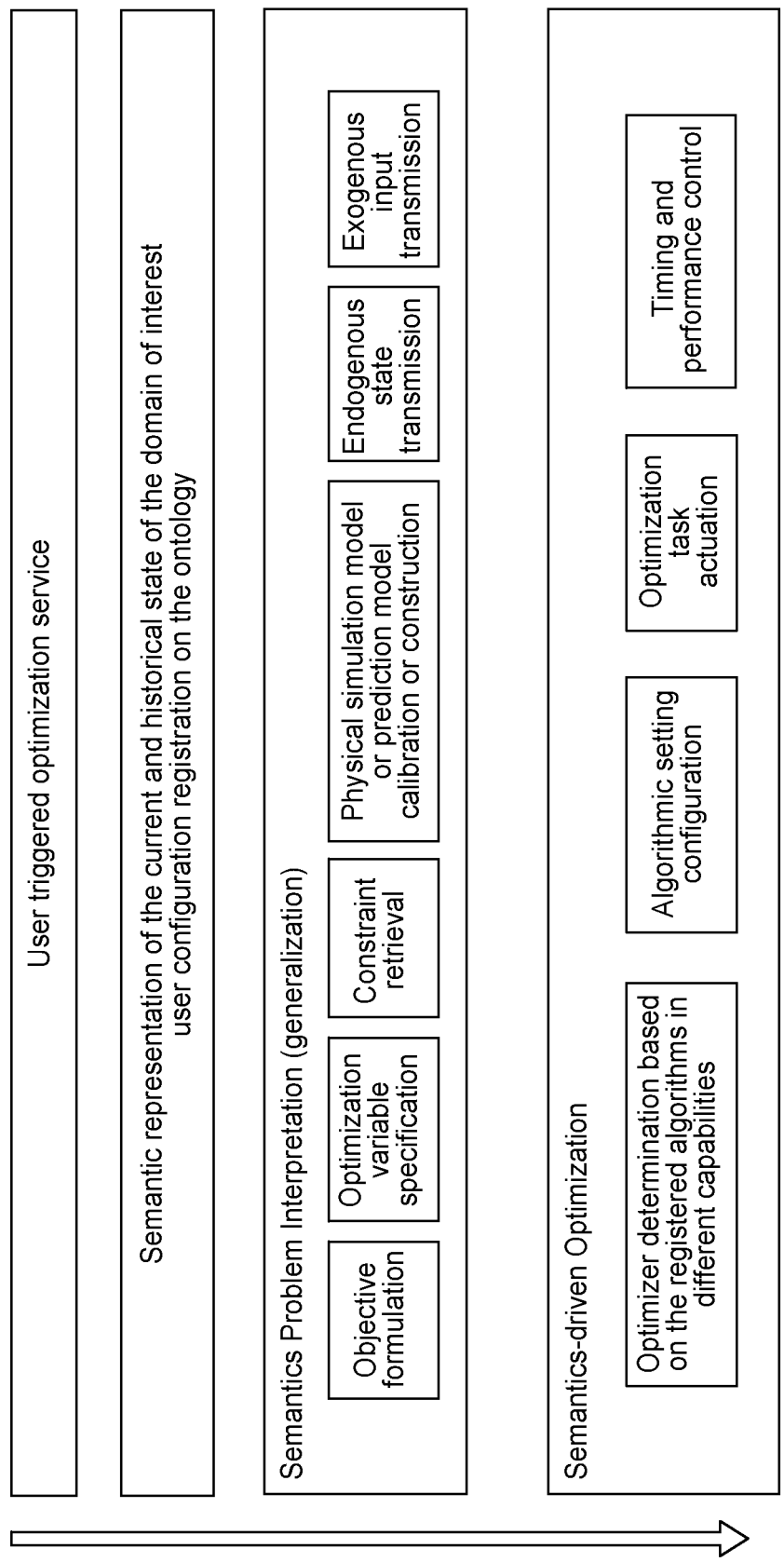
FIG. 6 depicts an example of a layered structure of a semantic-driven optimization service.

FIGS. 4, 5A, and 5B illustrate an example of the overall structure, interactions, and workflow for a semantic-driven prediction service.

A semantic-driven prediction service may be triggered directly by a non-expert end-user (e.g., through a user interface and the semantic manager 226), or indirectly by an optimization service. In either case, the prediction service is triggered with certain specified configurations that are determined based on the scenarios described by non-expert end-users.

The user-specified configurations, e.g., the use of a particular data-driven model, are then registered on the ontology server 216 through, in this example, the generalizedCharacteristicsPrediction, as shown in FIG. 3C. Then, a semantic manager (such as 226 in FIG. 2) may translate the prediction service by firstly inferencing a set of pertinent field variables and then sending the set to the prediction server 212, including optimizable and non-optimizable actuators (i.e. those allowed and forbidden to be automatically controlled), objective related variables (i.e. those to be predicted or involved in the optimization objective calculation), constrained variables (i.e. those associated with either inequality or equality constraints), and endogenous variables and exogenous variables (i.e. those considered as the internal consequence and external input for the artefact being dealt with). The optimizable, non-optimizable and constrained variables are distinguished and modelled by the ontology as continuous variables associated with upper and/or lower bounds and discrete variables associated with equality constraints, to be further elaborated in the following optimization service.

Then, the historically monitored data for the above inferenced set of pertinent field variables is collected from the time-series server 208 and transmitted to the prediction server 212 to enable the construction of a data-driven model.

In some cases, simple sensing errors such as missing values, repetitive readings and nonsense readings are corrected. This is done by applying a set of simple heuristic functions, e.g., by the semantic manager 226 in FIG. 2, prior to passing data to the variable selector. This is followed by any data filtering and fusion if appropriate or required by end-users.

If the predictive model is needed for replication of an existing simulation model, for example, to save the overall model reasoning time when conducting an iterative optimization procedure, multiple reasoning of the simulation model on the simulation server 202 with varying states of optimizable, non-optimizable and exogenous variables can be performed to generate the simulated data as if it was monitored in the field for later data-driven predictive model construction.

Based on the semantic relationship between input variables (features used to construct a machine learning model, i.e. dependent variables) and output variables, an ontology server (e.g., 216 in FIG. 2), provides a list of input features to be used to construct a machine learning model. This is done by including/excluding variables based on their scope (i.e. all variables below the current variable in context are included and all variables two levels above the current variable in context are included). However, these may be irrelevant variables, and having a large number of irrelevant or insignificant variables can reduce the accuracy of a machine learning model. Therefore, a variable selection service may automatically select the important features that are more relevant to a given problem.

The variable selection service has its own set of heuristics, which are used to determine the appropriate feature selection algorithm along with its hyper-parameters and all other relevant information (e.g. time required to select important features). The variable selection for selecting the most important variables and the actual predictive model construction process are then initiated with the semantic determination of the learning algorithm and predictive model as well as their setting configuration based on a deduced understanding of the prediction problem and the already conceptualized generalized characteristics representation of various entities of the system.

There are different categories of algorithms for performing variable selection, e.g. stepwise and regularization. As noted previously, a range of models and variable selection algorithms are implemented on the prediction server 212 before being used and their respective characteristics (being defined through generalizedCharacteristicsPrediction) are registered on the ontology server 216.

An example of variable selection algorithms is a random forest algorithm—a tree-based ensemble machine learning model. The algorithm replaces each input variable in turn by random noise and analyzes the deterioration of the performance of the model. The resulting deterioration of the developed model is then used as a measure of importance of that variable. It should be noted that the categories of methods together with the instance of an exact method do not statically exist in the system and they can be updated anytime through the corresponding ontology conceptualization when necessary. As detailed above, the variable selection service has its own set of heuristics, which are used to automatically select a variable selection algorithm based on the information stored in the semantic model (e.g. time required to run a the selection process, algorithm performance, etc.). This information is updated continuously during the runs of different feature selection process.

The whole model construction process is also semantically controlled in terms of computational time and model performance. After a prediction model is constructed, it is then registered on the ontology server together with the selected model variables, time-lag, and any metadata (e.g., model training and test errors) obtained as part of the model construction. The model reasoning process can then be performed whenever required as soon as such a predictive model for the variables of interest is constructed, being triggered either by the end-user or an optimization service as described below.

FIG. 5A depicts an example flow for a semantic-driven prediction service, as just described. FIG. 5B further depicts an example of the direct interaction between various system elements to implement the semantic-driven prediction service.

In particular, in FIG. 5B, an event is initiated by one of end user 100 or optimization server 214. Semantic manager 226 responds to the event by interfacing with ontology server 216 to capture domain and user requirements, and to infer variables and constraints based on the requirements. Ontology server 216 then sends the variables and constraints to prediction server 212. Prediction server 212 then retrieves historical data from time-series server 208. Prediction server 212 further retrieves simulation data from simulation sever 202, which simulation server also sends to time-series server 208. Prediction server 212 then determines predictor settings, variables, and objectives via ontology sever 216, with which it starts the model construction process. For example, prediction server queries ontology server 216 about constructed predictive models based on the selected model variables. Ontology server 216 responds with model metadata which prediction server 212 uses to finalize a prediction model. Finally, prediction server 212 uses the prediction model to generate results (e.g., predictions), which are sent back to semantic manager 226 in response to the original event.

Semantic-Driven Optimization Services

FIGS. 6, 7A1, 7A2, and 7B illustrate the schematic of the overall structure and the interactions and workflow for realization of semantic-driven optimization services.

Similar to the prediction services described above with respect to FIGS. 4, 5A, and 5B, the optimization service may be first triggered by a non-expert end-user with certain user configurations. The system, which already keeps the semantic representation of the current and historical states of the domain phenomenon/scenario under consideration, then translates the user configurations (preferences) and captures them in the ontology server 216 in the relevant layers (depicted in FIG. 2).

The user configurations in the context of optimization services can include any user-designated requirements (e.g. operational considerations and the use of a particular optimization or prediction algorithm associated with certain settings) or domain-specific information (e.g., energy tariff), and they are modelled by ontology based on the generalized characteristics representation, i.e. generalizedCharacteristicsVariables, generalizedCharacteristicsPrediction, or generalizedCharacteristicsOptimization.

In particular, these non-expert end-user-specified requirements together with other physical considerations (e.g., a pump's speed can only be adjusted to any value between 2500 rpm to 3500 rpm) placed upon any variables across the domain being modelled by the ontology server may be organized as equality and inequality constraints no matter their linear or nonlinear nature:

$$\begin{cases} l_i \leq v_i \leq u_i, & i = 1, \ldots, n, \text{ for inequality constraints} \\ & \text{or} \\ v_i \in \{a_{i,1}, \ldots, a_{i,m}\}, & i = 1, \ldots, n, \text{ for equality constraints} \end{cases}$$

In the equations above: $v_i$ is the i th system variable modelled by ontology that associated with a particular constraint, $l_i$; $u_i$ are the corresponding lower and upper bounds; $\{a_{i,1}, \ldots, a_{i,m_i}\}$ is the set of $m_i$ discretely allowable values for $v_i$; and n is the total number of ontologically modelled system variables. For inequality constraints related to a variable, only a lower bound or only an upper bound is allowed. On the other hand, for equality constraints, it is possible to have only one allowable value for the variable, though the use of multiple allowable values can be more commonly seen for the optimizable variables that can be specified with a set of permissible values. Notably, the mechanism underpinning the behavior of the artefacts being dealt with does not count as a constraint as this is already captured by the simulation server in the physical layer or by the prediction server in the data discovery layer (as depicted in FIG. 2).

If there are no simulation or prediction models for the domain problem being examined by the optimization service, the system will need to first build such a model; otherwise, the system determines one of the existing models and its setting parameters to evaluate control solutions during optimization.

The system then interprets each particular optimization problem triggered by the end-user and generalizes it to be understandable by an optimization algorithm. Given the constructed simulation 202 or prediction server 212, this essentially includes raising queries to identify a set of selected field variables including optimizable and non-optimizable actuators, objective related variables, constrained variables, endogenous variables, and exogenous variables, and their constraint and time-lag information.

The obtained optimization problem can be generalized as: min $J(V_o)$ subject to articulated constraints (e.g., those inequality and equality constraints described above) where $J(V_o) = [J_1(V_o), \ldots, J_l(V_o)]^T \in R^l$ denotes a vector of l objectives, and $V_o \in R^s$ denotes a vector of s optimizable variables.

The objectives are distinguished into those directly calculated from the model output of a simulation or prediction server and those indirectly calculated where additional information is required and to be provided by the end-user (e.g., energy tariff in energy cost minimization scenarios). Once the optimization problem is semantically formulated, the system transmits data for optimizable, non-optimizable, endogenous, and exogenous variables at specific timestamps identified using the above time-lag information, to the optimization server.

The optimization is thereby semantically initiated through the optimizer determination and algorithmic setting configuration while also under appropriate timing and performance control. In this respect, the optimization algorithms are categorized in terms of their ability of dealing with different types of problems, such as continuous, discrete and mixed-integer problems, together with their other potential characteristics (e.g., being defined through generalizedCharacteristicsOptimization).

As noted previously, a range of algorithms (e.g., artificial intelligence algorithms such as genetic algorithms, particle swarm optimization, and differential evolution) are already conceptualized within the ontology designed for the optimization server. Then, informed by the translated optimization problem (together with any user preferences if provided), the system decides which optimizer to use, while also providing configurations for algorithmic settings.

For example, a less time-critical control problem may be allocated a better-performing optimizer needing longer optimization time, which may result in a more accurate predictive or simulation model. Alternatively, in a more time-critical control problem, a lesser performing optimizer needing less optimization time may be used.

During the optimization process, the simulation model or predictive model is continuously executed with the input of iteratively optimized intermediate solutions and monitored, simulated, or predicted data of any non-optimizable, exogenous, and endogenous variables. The obtained optimized solutions and the metadata as part of the optimization process are translated via the ontology server 216, and also sent to the time-series server 208 for record, the field for actuation, and the user for visualization or approval. For example, the optimization process will produce data related to the optimization algorithm, such as the time taken to solve the optimization problem, hyper-parameters of the algorithm, the algorithm's performance, etc.

Figure 7B:
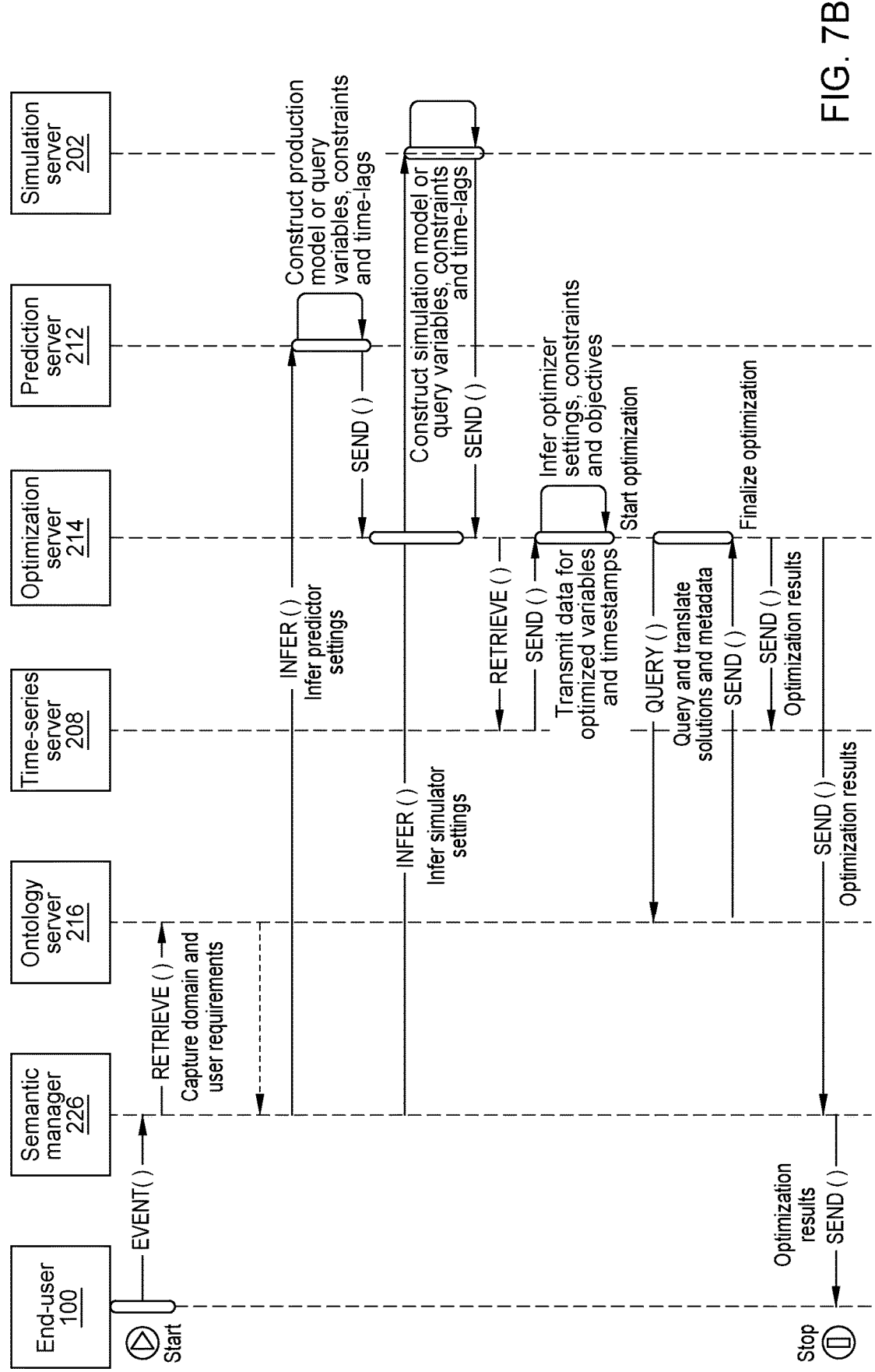
FIG. 7B depicts an example of the direct interaction between various system elements to implement a semantic-driven optimization service.

FIGS. 7A1 and 7A2 depict an example flow for a semantic-driven optimization service, as just described. FIG. 7B further depicts an example of the direct interaction between various system elements to implement the semantic-driven optimization service.

In particular, in FIG. 7B, an end user triggers an event at semantic manager 216, which then interacts with ontology server 216 to capture domain and user requirements. Semantic manager 226 then interacts with prediction server 212 to infer predictor settings by constructing a prediction model or querying variables, constraints, and time-lags for an existing model. The resulting predictor settings are sent to optimization server 214. Semantic manager 226 also interacts with simulation server 202 to infer simulation settings by constructing a simulation model, or querying variables, constraints, and time-lags for an existing model. The resulting simulator settings are then sent to optimization server 214. Optimization server 214 then retrieves data from time-series server 208 and optimizer settings, constraints, and objectives are established. Optimization server 214 then queries ontology server 216 and receives solutions and metadata that allow optimization server 214 to finish the optimization. The results of the optimization are sent to time-series server 209 as well as to semantic manager 226, which in-turn provides the optimization results to the end user.

Connected Objects and Semantic Management

Figure 8:
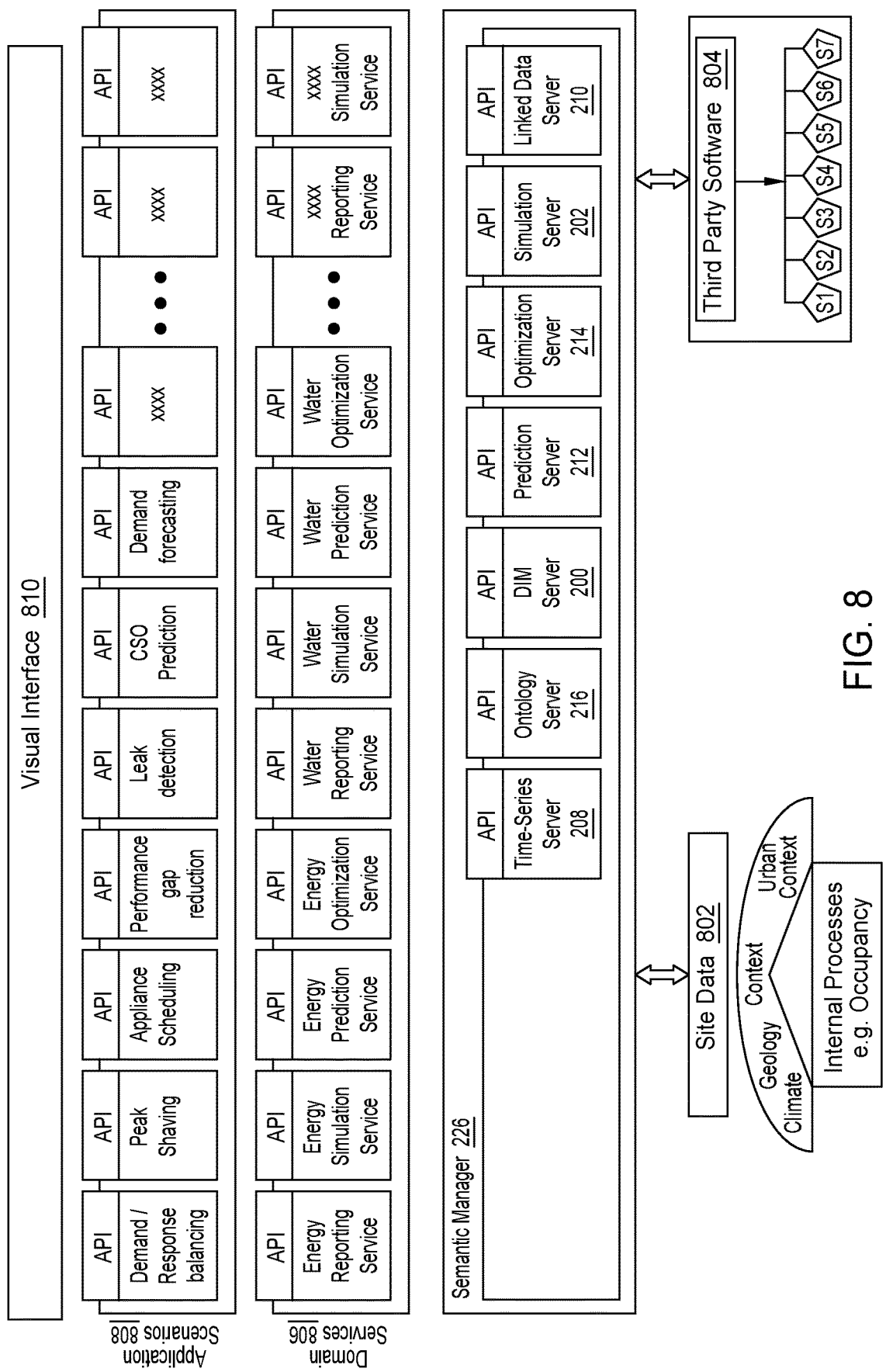
FIG. 8 depicts an alternative embodiment of a system including connected objects.

FIG. 8 depicts an alternative embodiment of a system including connected objects. For example, the system depicted in FIG. 8 includes connections to site data 802, third-party software 804, domain services 806, application scenarios 808, and user visual interface 810. In this example, the system is implemented as a framework composed of independent modules that sense, contextualize, infer, and propose an actuation strategy to address specific scenarios 808 via domain services 806 under a human controlled (supervision) environment.

To perform domain services 806, the semantic manager 226 utilizes the API (Application Programming Interface) exposed by each component. In this manner, each application scenario 808 can invoke multiple domain services 806, and each domain service 806 can then invoke multiple components within the system through the semantic manager 226. In addition to the software employed to realize various system components, third-party software 804 can also be adopted given it is compatible to the existing components as developed. Moreover, in some embodiments, the overall system is distributed, including in "the cloud", to further improve flexibility and scalability for the system's design, implementation, operation, and maintenance efficiency.

To actuate semantic performance management services, the system depicted in FIG. 8 supports three types of actuation principles.

First, user-based actuation includes non-expert end-users initially triggering or terminating the semantic performance management services by the specification of an application scenario 808 via the specification of scenarios through the user interface 810.

Second, sensor-based actuations include the semantic manager 226 monitoring incoming data from sensors (e.g., via remote terminal units 204 and gateways 206) and, once a sufficient quantity of sensor data is received, performing next time-step prediction or optimization processes.

Third, system-based actuations include the semantic manager 226 triggering performance management services at, for example, predetermined time intervals. In some embodiments, sensor-based and time-triggered events may also be used in combination to determine if there is a malfunction with, for example, a sensor, and to trigger a dependent service. For example, if a sensor malfunctions and does not report data properly, a prediction service may be performed based on projected data rather than real data meant to be received but for the malfunction.

Apart from the time-triggered events, there are also anomaly-triggered system events (events from system failure) when any component of the system is not performing correctly.

The overall process may include a non-expert end-user describing an application scenario 808 via the user visual interface 810. After a related domain service 806 is initiated, the semantic manager 226 then receives the request and works together with the ontology server 216 (as it holds every component's information of the system) to interpret the domain service 806 and to semantically initiate with other servers (in case of an optimization service, these would be the time-series server 208, optimization server 214, and simulation/prediction server 202/212).

Once a full set of the sensor events related to the domain service 806 have been collected by the semantic manager 226, it then communicates with the corresponding severs (where this is sensor event triggered and may also be associated with a time-triggered system event as described above), for example, the prediction server 212 for an update of the next step predictions. The newly generated data from the system including the prediction and actuation signals is deposited in the time-series server 208 and also sent to the visual interface 810 for decision making or the field for actuation.

The semantic manager 226 therefore utilizes the event-based actuation of performance management services. This event-based processing functions by identifying a set of events $E=\{e_1, e_2, e_3, \ldots e_p\}$ in the form of data tuples that are circulated within the system and to which servers $M=\{m_1, m_2, m_3, \ldots, m_k\}$, can subscribe; where each $e_i$ is a data tuple such as:

$$e_i=[event_{id}, event_{name}, semantic_{identifier}, observation_{list}, command_{list}, data]$$

An event $e_i$ can be created by a system component (server), $m_k \in M$, in the form of data tuples associated with (i) knowledge discovery for ontology server 216, (ii) knowledge generation for prediction server 212, optimization server 214, simulation server 202, and (iii) knowledge storage and discovery for DIM server 200, time-series server 208, and linked data server 210. The semantic manager 226 itself can create events for coordinating the performance management process.

Figure 9:
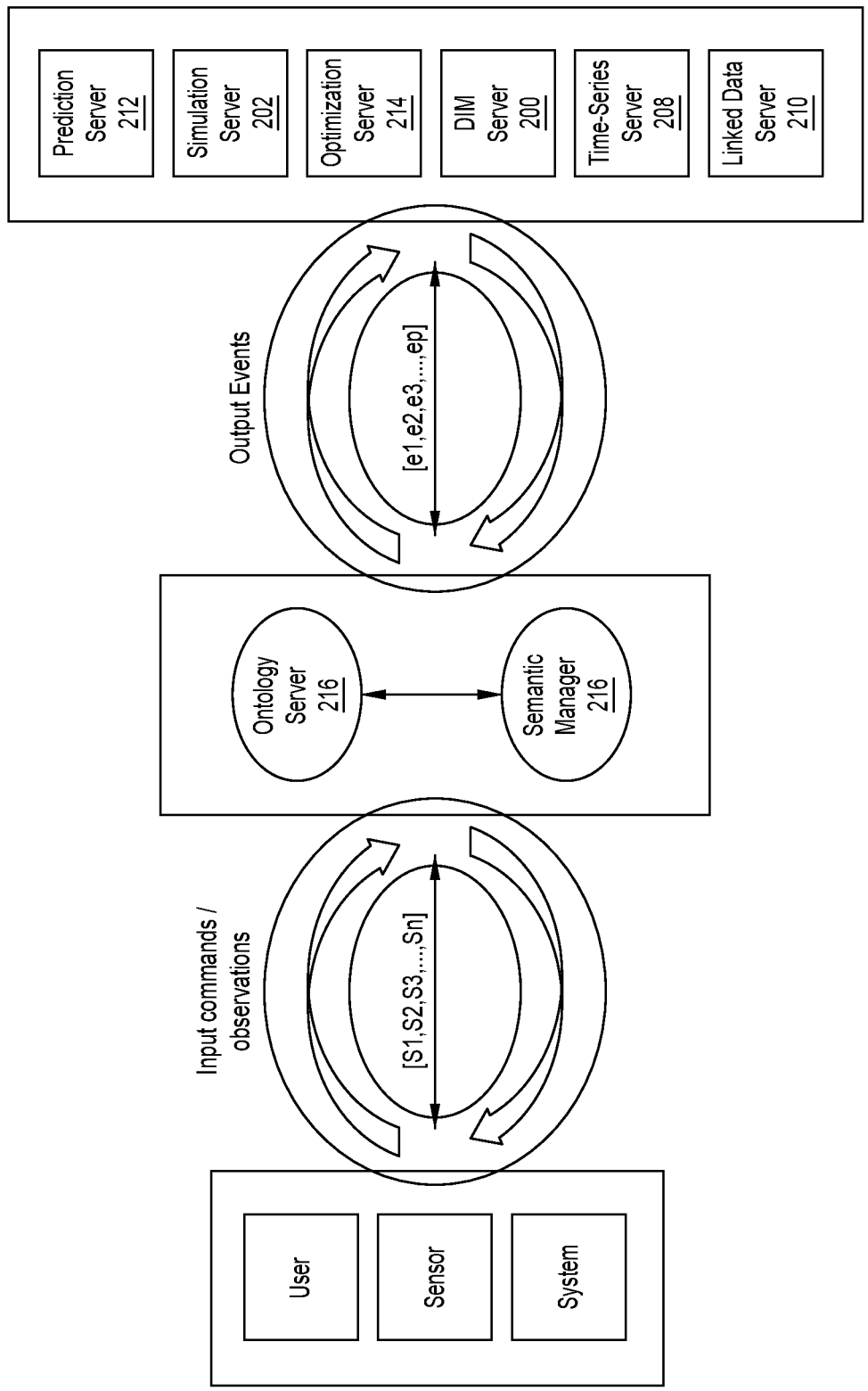
FIG. 9 depicts the architecture of the semantic management.

FIG. 9 depicts an example of the sematic manager 226 handling three types of events: sensor events, systems events, and user events $Ec=\{e_1, e_2, e_3\}$, $Ec \subset E$, to which servers can subscribe a-priori and based on which workflows, as described herein, takes place.

In this example, for each event $e_1$, a server $m_j$ or a set of servers $Mc=\{m_1, m_2, m_3, \ldots, m_v\}$, $Mc \subset M$, $v \le k$, have subscribed and trigger their associated process when such events are circulated.

The semantic manager 226 thus has the ability to orchestrate the semantic performance management process supported by different system components providing the communication means of data tuple events to propagate within the system in accordance to a set of determined objectives.

Example Implementation in the Built Environment in the Energy Domain

Energy consumption in buildings represents a major challenge with solutions ranging from best practices to human-assisted energy management. For example, in buildings, HVAC systems are a significant contributor towards higher energy consumption and therefore there is need to optimize their operation.

Optimizing HVAC operation is a challenging problem due to system non-liberalities and delays. Energy performance management solutions are required to respond to events and changes within and outside a building in a more dynamic, automatic, and adaptable way to achieve energy saving targets. Reducing energy consumption can be achieved using different strategies with single or multiple objectives, wherein each strategy identifies associated reduction rates. However, such methods may need to be assessed and determined based on specific criteria and thus often require expert intervention.

The system describe herein may be deployed in built environment domain to determine, for example, a scheduling strategy for enhancing thermal comfort, visual comfort, and indoor air quality via semantic-driven optimization.

FIG. 10 demonstrates a use case scenario for determining the optimal scheduling strategy for enhancing indoor air quality, visual comfort, and thermal comfort while minimizing energy consumption (i.e. sum of heating, ventilation, and lighting energy consumption). Given this particular example, DIM server 200 is constructed using existing Building Information Modelling (BIM) data and is used to identify correlations between, for example, spaces, facilities, outdoor/indoor spaces' connections, and the like.

The ontology server 216 then creates a representation for the physical and non-physical artefacts modelled in the BIM data. Based on this, the ontology server 216 additionally contextualizes different sensors and meters (e.g. indoor air temperature and $CO_2$ sensors) within the building. This information modelled by ontology server 216 is then used to retrieve and select exogenous, endogenous, and objective related variables. During this problem formulation step, the non-expert end-user's specified objective is to optimize HVAC operation every 15 min.

To realize this specified objective, the system provides an autonomous evaluation of the problem mapped into the following steps: (1) objective formulation to determine the correct optimization objective, (1) optimizable variable specification to determine the key variables that can be optimized, (3) constraint retrieval to specify the set of constraints based on which optimization is approached, (4) model construction, and (5) selection of the endogenous and exogenous variables.

In this example, the semantic manager autonomously determines the need for developing a predictive model instead of using a simulation model utilizing heuristics based on the response time constraint (i.e. >15 minutes) and the inferred requirement to implement a near real-time optimization strategy.

In this scenario, the objective function of the problem is to minimize the total energy consumption. The objective function $f$ can be expressed as below, $$f(x)=[Q_H(x)+Q_L(x)+Q_F(x)]/3.6\times 10^6$$

where $Q_H$, $Q_L$ and $Q_F$ are the space's heating, lighting and fan energy consumption respectively. The denominator is used to express energy consumption in kWh. Further in this example, the constraints of the problems are:

$$21° C. \le T_{indoor} \le 23° C.$$

$$300 \text{ lux} \le DI_{indoor} \le 500 \text{ lux}$$

$$IAQ_{indoor} < 1000 \text{ ppm}$$

where the indoor air temperature needs to be between 21° C. and 23° C., daylight illuminance should be between 300 lux and 500 lux, and indoor $CO_2$ concentration should be less 1000 ppm. These constraints avoid sacrificing occupant comfort.

In case there is not any predictive model already developed for the above problem, the system also sends an event to the prediction server 212 to develop a predictive model. The data-driven predictive model is then semantically constructed without any expert intervention. As part of this process, the semantic manager first triggers the variable selection service (part of the prediction server 212) to select most important features for developing the prediction model of the above problem. Once the input variables are selected, this information is then used to develop prediction model. A range of different state-of-the-art machine learning algorithms are being implemented in CUSP (e.g. artificial neural network, decision trees, etc.). The resulting prediction model is then saved and the metadata (e.g. performance of the prediction model, time taken to develop the model, its hyper-parameters, etc.) is then stored in the ontology server. The meta-data is then used in future to select a most appropriate prediction model.

In order to accomplish the semantic construction of the predictive model without expert intervention, the semantic manager 226 works in combination with the ontology server 216 and time-series server 208 to prepare historical data containing continuously and discretely optimizable variables, endogenous variables, and exogenous variables. The semantic manager 226 then sends the variables to the prediction server 212.

In this example, the endogenous variables include time related information (e.g. hour the day), indoor air temperature, indoor relative humidity, and indoor daylight illuminance values. Further in this example, the exogenous variables include outdoor air temperature, outdoor relative humidity, outdoor $CO_2$ concentration, and wind speed.

In this example, the prediction server 212 autonomously selects the important features for developing the model, as described above. As part of developing prediction models, the metadata (models' performance, training time, hyper-parameters, etc.) are stored in the ontology server. The semantic manager 226 uses this information to determine the most efficient/appropriate machine learning algorithm. The prediction server 212 then trains the model and sends an event to the sematic manager 226 that the predictive model for the given problem has been developed and stored. The related information (e.g., model's performance metric on testing dataset, names of the features used during model development process, model type and complexity, model's hyper-parameters, etc.) is then also conceptualized onto the ontology server 216.

Once the predictive model is constructed, the optimization server 214 is then invoked by the semantic manager 226 with the autonomous determination of the best suited algorithms and hyperparameters for the problem. The optimization server 214 then performs the optimization process and communicates directly with the prediction server 212 to evaluate possible solutions. Once the optimization process is finished, the optimized values for window blind position, heat recovery unit operation, and window opening are implemented within the building to optimize the HVAC efficiency.

Importantly, the overall workflow has no particular requirement of expert involvement because the system enables autonomous semantic energy performance management of the building.

Example Implementation in the Built Environment in the Water Domain

The operational efficiency of the water network presents a challenging task to water companies as a result of the complex interplay between the network structure, consumer demand profiles, energy tariffs, and operational requirements. In some cases, a small variation of one factor can be propagated, in conjunction with other factors, to significantly reduce the water network performance. Conventional optimization approaches lack a holistic solution for the problem by taking into account all these factors systematically. More importantly, they are also site-specific and require heavy expert intervention to apply to a different site or water company.

By contrast, the system described herein involves the creation of a DIM, modelling the sensing and storage system, which creates an accurate understanding of the physical water network (e.g. pumps, valves, tanks, and their characteristics, such as pump curves) and their current and historical states (e.g. via on-site sensing techniques).

In this example, the water company operators (non-expert end-users) are able to formulate and configure specific optimization scenarios, such as the minimization of energy consumption from all the pumping stations, using the visual interface 310. These optimization scenarios can include operational requirements (e.g. tank operational levels, minimum delivered pressure head, and control time-interval), optimizable variables (e.g., a subset of pumps and valves), demand profiles, energy tariff, and setting parameters for the use of a specific optimization and prediction algorithm. For example, fixed-speed pumps are associated with discrete constraints (i.e. on/off operation), while variable-speed pumps possess bound constraints (i.e. being continuously adjusted within a range).

These chosen configurations from the non-export end-user as a whole are considered as a performance management scenario and sent to the ontology server 216 of the system, which then communicates with other servers 200-214 to have these configurations properly modelled. Based on all the above information and as reflected in FIG. 6 and FIG. 7, the semantic manager 226 is able to make queries to the ontology server 216 to inference a list of optimizable/non-optimizable variables (pump and valve states), objective related variables (energy consumption from pumps), constrained variables (tank operational levels and minimum delivered pressure head), endogenous variables (flows, pressure heads and water quality), and exogenous variables (consumer demands and energy tariff).

Based on the chosen control time-interval (e.g. 1 hour), the semantic manager 226 will then decide whether to use a hydraulic model (such as an EPANET model) or a prediction model (which the prediction server can create automatically) for assessing the water behavior of different trial control strategies to be generated by the optimization algorithm.

With the translated optimization problem, to initiate the optimization process, the semantic manger 226 then transmits data at specified timestamps for the above list of variables and determines the specific algorithm and its setting parameters to the optimization server 214. The optimized control strategies for pumps and valves are finally sent back to the field for actuation and also logged onto the time-series sever 208, via the interpretation of the ontology server 216; the ontology that stores all the information related to the prediction algorithms, prediction models, optimization algorithms, etc.

Example User Interface for Real Time Performance Management

Figure 11A:
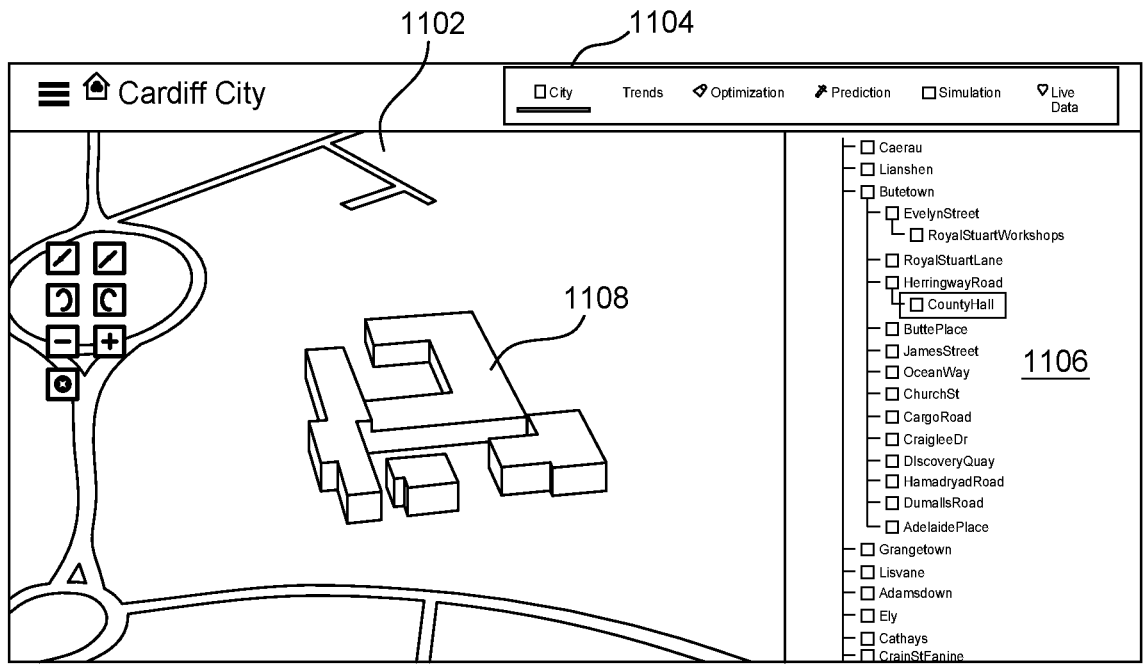
FIGS. 11A and 11B depict aspects of an example user interface for performing semantic optimization for real-time performance management.
Figure 11B:
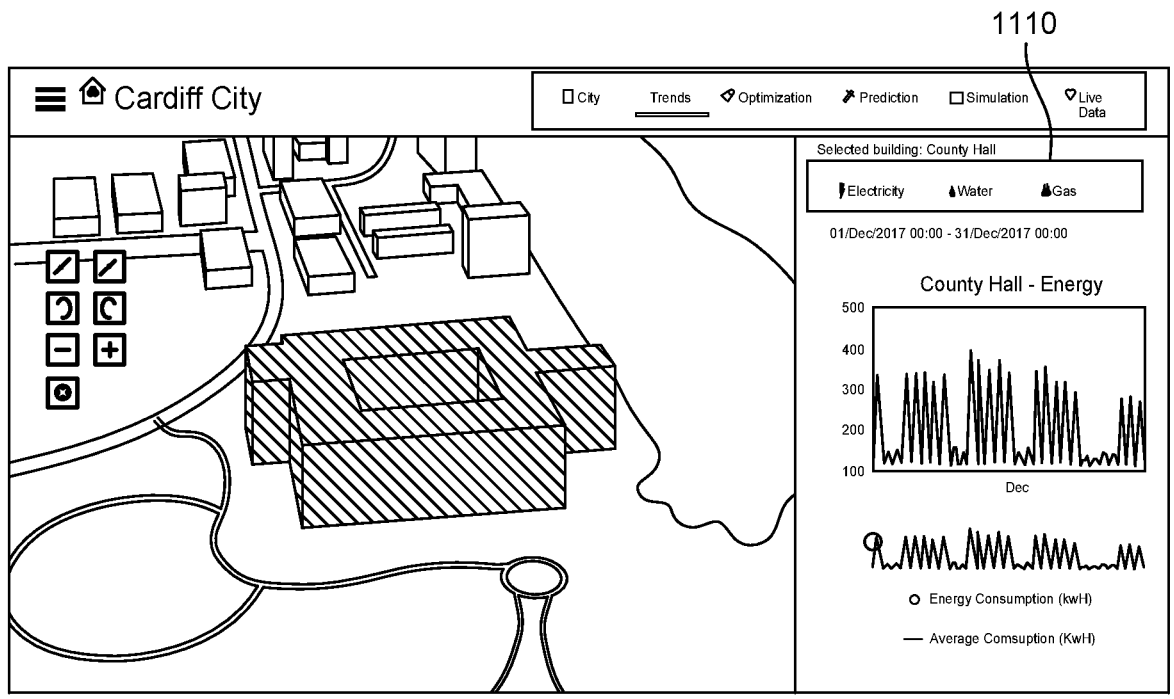

FIGS. 11A and 11B depict aspects of an example user interface for performing semantic optimization for real-time performance management.

In particular, FIG. 11A depicts a portion of a graphical user interface showing a site map 1102 in which various artefacts are depicted. The user interface may be displayed by, for example, a remote terminal unit, such as remote terminal unit 204 described above with respect to FIG. 2.

The artefacts in site map 1102 are rendered based on a semantic domain model, which may include data from a building information model (BIM) and stored, for example, on a DIM server, such as DIM Server 200 in FIG. 2. Though not depicted in FIG. 11A, the semantic domain model of the various structures in site map 1102 may include detailed information about the build, layout, features, systems, and other aspects of a building, such as the sample building 1108 depicted in FIG. 11A.

FIG. 11A further depicts a portion 1106 of the user interface (e.g., a pane or window in this example) that includes a hierarchical representation of the semantic domain model, which in this example depicts elements within the semantic domain model, including locations, streets, and buildings.

FIG. 11A further depicts user interface elements 1104, which in this example are buttons that navigate to different portions of the user interface. User interface elements 1104 include the following buttons and functionalities in this example: "Site" displays the hierarchical artefacts extracted from the ontology server 216 as described above; "Trends" displays historical data of the current selected item from time-series server 208 and from the domain model 200 along with trends elicited from that data; "Optimization" displays results of the optimization process; "Prediction" displays results of the prediction process; "Simulation" displays results from the simulation process; and "Live Data" displays the current live data received by the system from the site.

A user may employ a user interface navigation element (here, a cursor) to select an artefact within the hierarchical view 1106, which in this example refers to a building called "County Hall". Upon selecting the artefact, the site view 1102 changes to show the selected building, as depicted in FIG. 11B.

In FIG. 11B, various data regarding the selected artefact (here, a building) are displayed as trends in another portion of the user interface (e.g., another pane or window). As depicted in this example, electricity consumption data for the selected building are displayed. However, other data, such as other consumption data, can be displayed via selection of user interface elements 1110. These data related to the selected artefact may be stored, for example, in the time-series server 208 of FIG. 2.

Figure 12A:
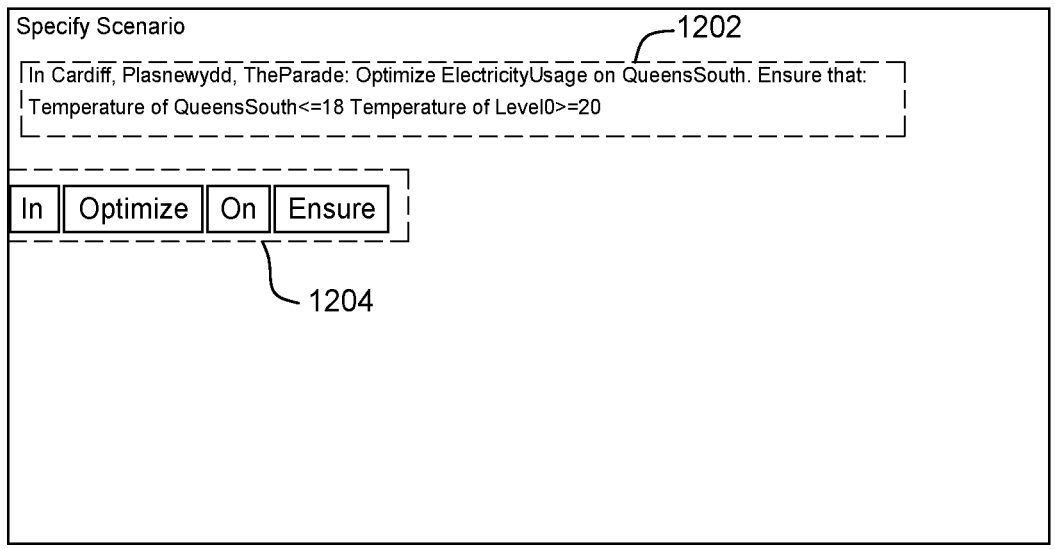
FIGS. 12A and 12B depict additional aspects of an example user interface for performing semantic optimization for real-time performance management.
Figure 12B:
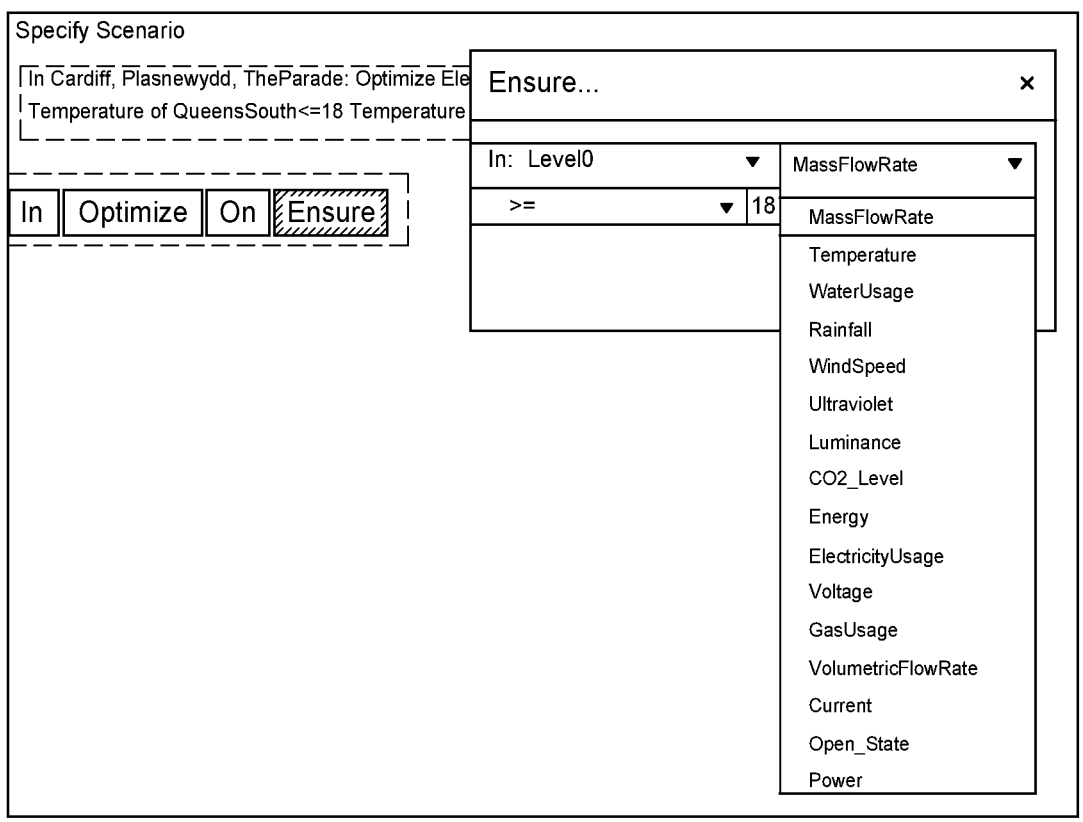

FIGS. 12A and 12B depict additional aspects of an example user interface for performing semantic optimization for real-time performance management.

In particular, FIG. 12A depicts a portion of a user interface for allowing a user to enter an optimization scenario using a structured natural language statement 1202, such as discussed above with respect to FIG. 2. Further, user interface elements 1204 are provided for summoning menus to assist with the creation of the structured natural language statement.

For example, as depicted in FIG. 12B, selecting the "Ensure" button results in an additional user interface element 1206 that allows a user to select a location ("Level0") in a particular building, a variable for a constraint ("Temperature"), a constraint logic (">="), and a value for the constraint ("18").

Notably, the various options available in the drop-down menus may be variables stored in DIM server 200 of FIG. 2 and modeled by ontology server 216 of FIG. 2.

Figure 13A:
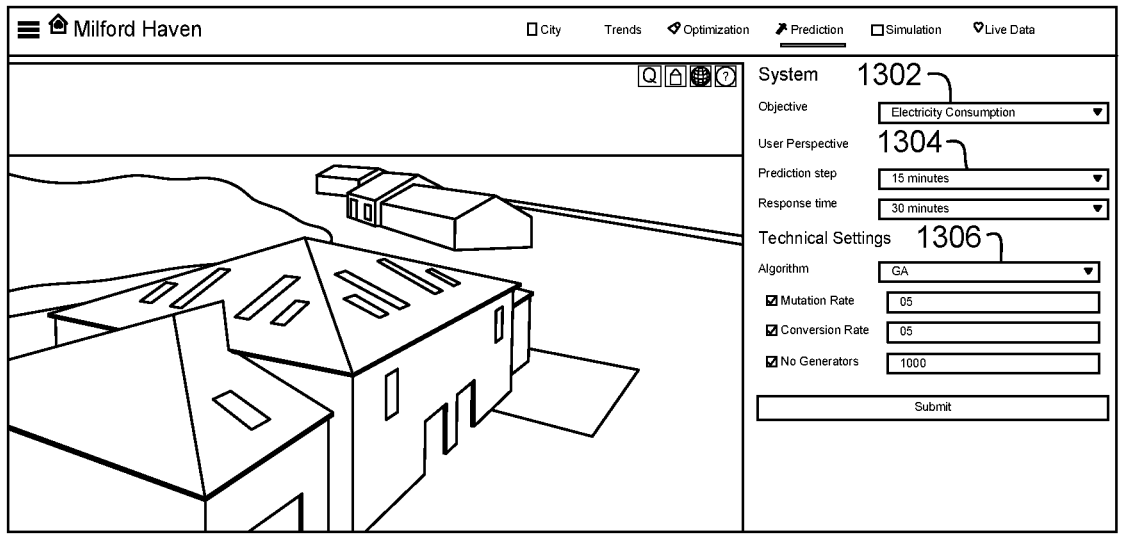
FIGS. 13A and 13B depict additional aspects of an example user interface for performing semantic optimization for real-time performance management.
Figure 13B:
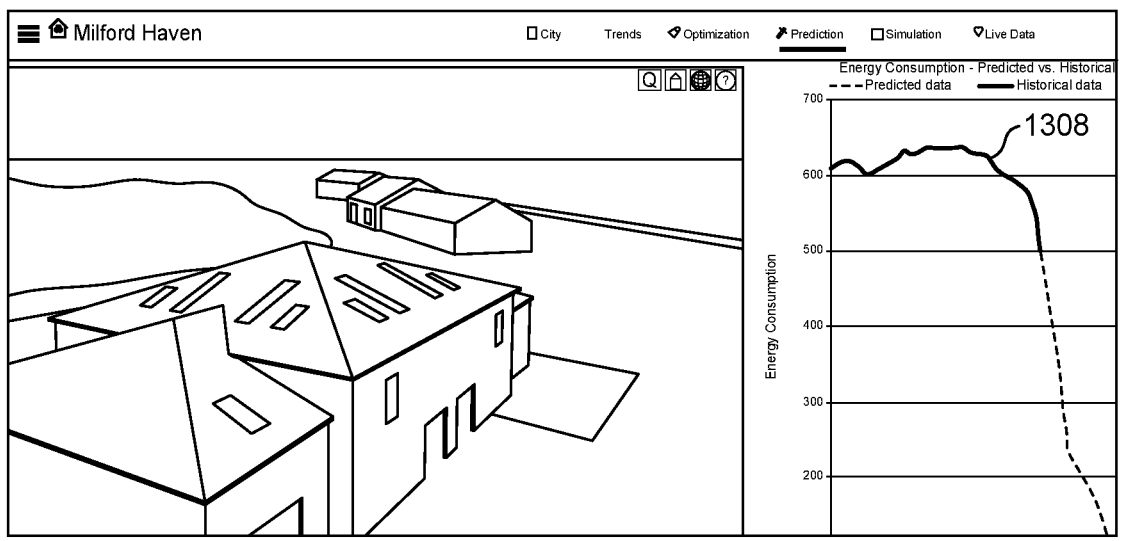

FIGS. 13A and 13B depict additional aspects of an example user interface for performing semantic optimization for real-time performance management.

In particular, FIG. 13A depicts an example of allowing a user to enter basic information for an optimization task to create predictions. In this example, electricity is chosen as an optimization objective 1302 and then user perspective variables 1304 are selected, which in this example include prediction step and response time. Further in this example, a set of optimization algorithms 1306 are recommended to the user, such as a genetic algorithm ("GA") here, as well as attributes for the model, such as mutation rate, conversion rate, and number of generations in this example. The genetic algorithm may be a registered algorithm with the ontology sever 216 of FIG. 2, as described above. The recommended set of optimization algorithms are best fitted for the scenario being explored. Notably, allowing the user to select an algorithm is an alternative to the automatic mode where the system will select one best fitted algorithm. Thus, the system has two modes of operation for algorithm selection: system-driven (automatic) and user-driven.

As depicted in FIG. 13B, the results 1308 of the optimization, which may be performed by optimization server 214 of FIG. 2, are depicted as predicted versus historical energy use for a particular built environment. The predicted values may be generated by prediction server 212 of FIG. 2.

Figure 14A:
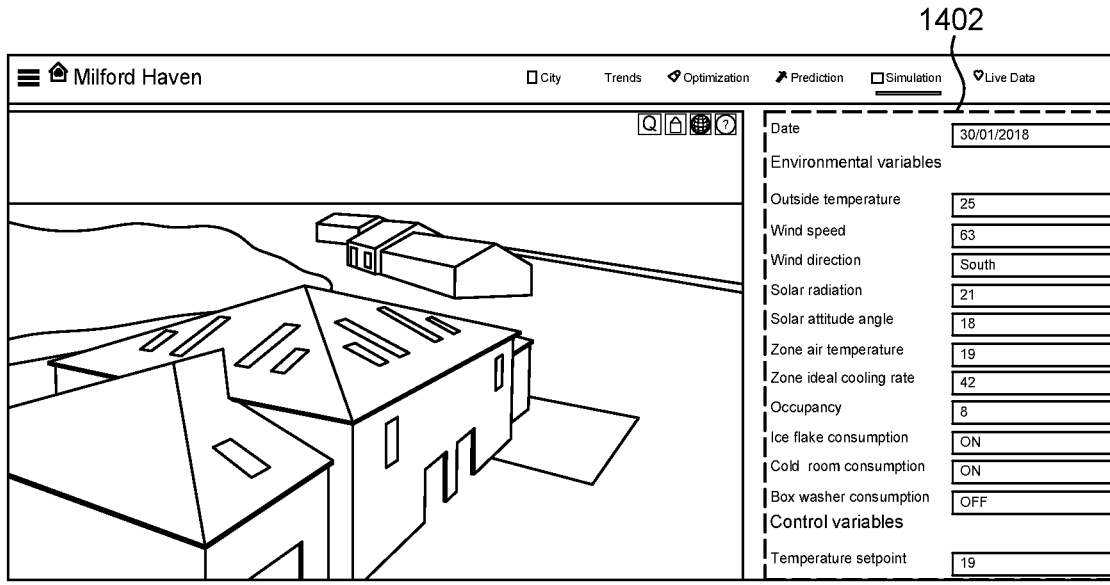
FIGS. 14A and 14B depict additional aspects of an example user interface for performing semantic optimization for real-time performance management.
Figure 14B:
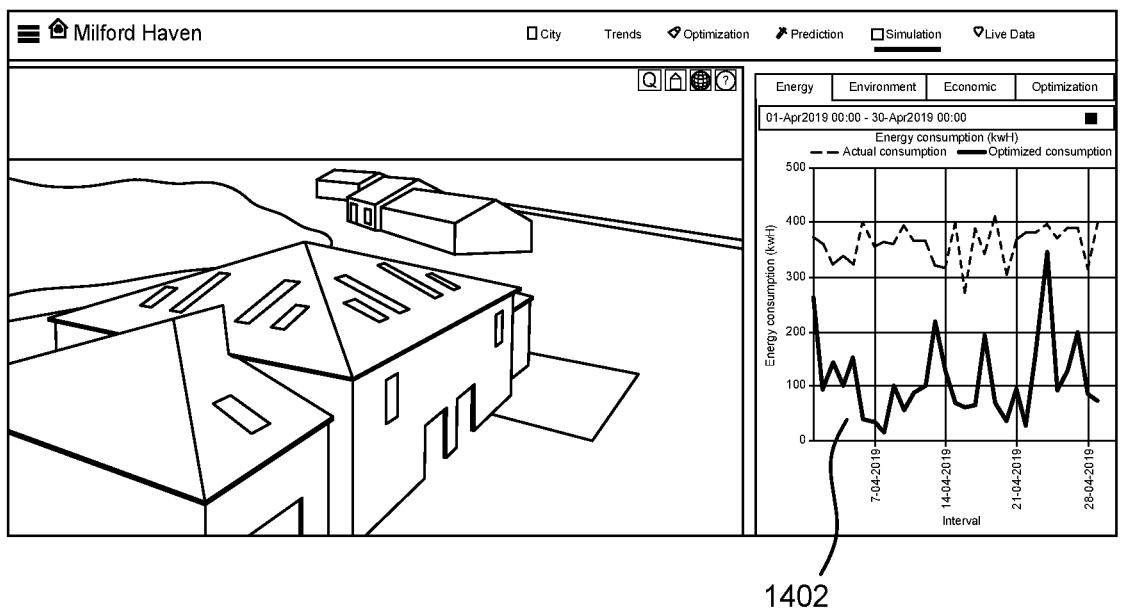

FIGS. 14A and 14B depict additional aspects of an example user interface for performing semantic optimization for real-time performance management.

In particular, in FIG. 14A a portion of the user interface allows a user to select variables 1402 (e.g., environmental and control variables in this example) for running a simulation. The variables may be registered with the ontology sever 216 of FIG. 2, as described above.

FIG. 14B depicts an example of a simulation 1404 of future performance of the built environment using the current settings as well as optimized settings, which may be generated by defining an optimization scenario as described above. In this example, the optimized settings are pre-populated for the user.

Example Methods of Performing Real-Time Performance Management

Figure 15:
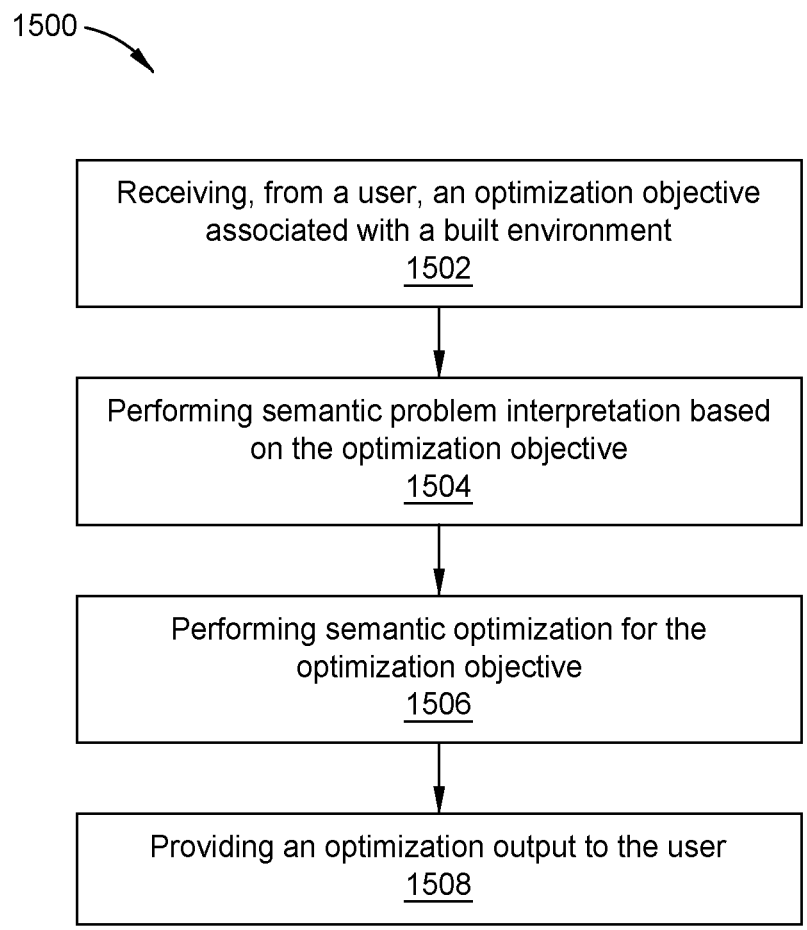
FIG. 15 depicts an example method for user-actuated optimization of a built environment scenario.

FIG. 15 depicts an example method 1500 for user-actuated optimization of a built environment scenario.

Method 1500 begins at step 1502 with receiving, from a user, an optimization objective associated with a built environment.

Method 1500 then proceeds to step 1504 with performing semantic problem interpretation based on the optimization objective.

In some embodiments, performing semantic problem interpretation based on the optimization objective comprises: selecting one or more optimization variables, wherein each optimization variable is associated with the built environment via an domain information model; determining one or more constraints; determining one or more endogenous variables associated with the build environment; and determining one or more exogenous variables associated with the built environment.

In some embodiments, performing semantic problem interpretation based on the optimization objective further comprises: selecting one or more simulation models associated with the one or more optimization variables from a plurality of simulation models registered with an ontology server; and generating simulation output data based on the one or more machine learning models.

In some embodiments, performing semantic problem interpretation based on the optimization objective further comprises: determining no suitable simulation model associated with the one or more optimization variables is registered with an ontology server; generating one or more machine learning models, wherein the output of each of the one or more machine learning models is associated with at least one of the one or more optimization variables; and generating simulation output data based on the one or more machine learning models.

In some embodiments, determining whether to generate one or more machine learning models comprises determining to create one machine learning model with multiple outputs.

In some embodiments, determining whether to generate one or more machine learning models comprises determining to a plurality of machine learning models, wherein each machine learning model of the plurality of machine learning models has a single output.

Method 1500 then proceeds to step 1506 with performing semantic optimization for the optimization objective.

In some embodiments, performing semantic optimization for the optimization objective comprises: selecting an optimization model associated with the one or more optimization variables from a plurality of optimization models registered with an ontology server; determining one or more configurations for the selected optimization model; providing simulation data to the selected optimization model; and generating, via the optimization model, the optimization output.

In some embodiments, the optimization model is a genetic algorithm model.

In some embodiments, the optimization model comprises receiving a selection of the optimization model from the user.

In some embodiments, determining one or more configurations for the selected optimization model comprises receiving the one or more configurations from the user.

Method 1500 then proceeds to step 1508 with providing an optimization output to the user.

In some embodiments of method 1500, the optimization objective comprises a structured natural language statement.

Some embodiments of method 1500 further include: transmitting a command to an element of the built environment, the command comprising a setting based on the optimization output. In some embodiments, the element is an HVAC system, a power system, a networking system, a lighting system, an irrigation system, or any other system of a building as described herein. In some embodiments, the setting is a run schedule, such as an HVAC run schedule, which may include a run schedule and associated temperature settings. The run schedule could also be a lighting schedule, or an irrigation system schedule, or the like.

In some embodiments, the element may be a multi-source multi-carrier energy hub, and the setting may be a coordinated setpoint schedule for the energy generation mix in the hub. In some embodiments, the element may be one or more controllable window blinds, and the setting is a schedule for the percentage of vertical window opening and the blind slat angle. Many other examples exist.

Figure 16:
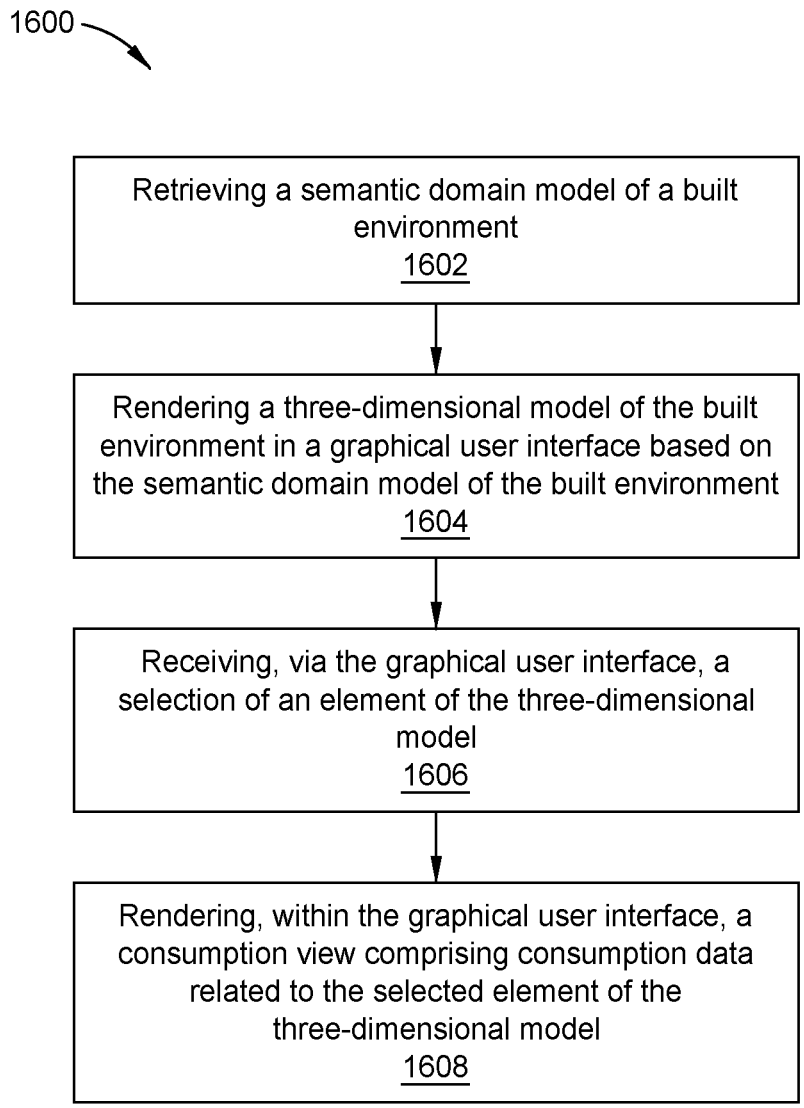
FIG. 16 depicts an example method for providing performance management in a built environment.

FIG. 16 depicts an example method 1600 for providing performance management in a built environment.

Method 1600 begins at step 1602 with retrieving a semantic domain model of a built environment.

Method 1600 then proceeds to step 1604 with rendering a three-dimensional model of the built environment in a graphical user interface based on the semantic domain model of the built environment.

Method 1600 then proceeds to step 1606 with receiving, via the graphical user interface, a selection of an element of the three-dimensional model.

Method 1600 then proceeds to step 1608 with rendering, within the graphical user interface, a consumption view comprising consumption data related to the selected element of the three-dimensional model.

In some embodiments, the consumption data relates to one of: an electricity consumption, a water consumption, or a gas consumption.

In some embodiments, method 1600 further comprises: rendering, within the graphical user interface, based on the semantic domain model of the built environment, a hierarchical view of the built environment, wherein the hierarchical view includes a plurality of graphical user interface elements each associated with an element in the semantic domain model of the built environment.

Figure 17:
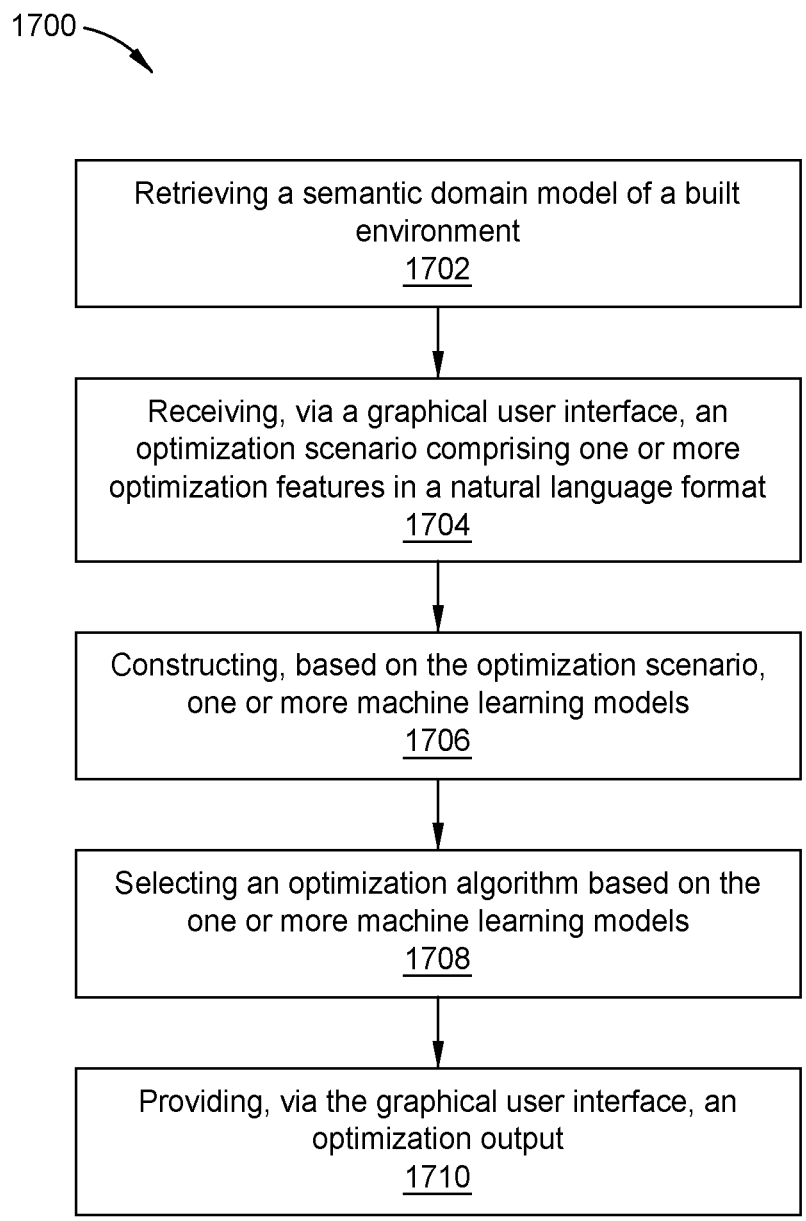
FIG. 17 depicts an example method for providing performance management in a built environment.

FIG. 17 depicts an example method 1700 for providing performance management in a built environment.

Method 1700 begins at step 1702 with retrieving a semantic domain model of a built environment.

Method 1700 then proceeds to step 1704 with receiving, via a graphical user interface, an optimization scenario comprising one or more optimization features in a natural language format.

Method 1700 then proceeds to step 1706 with constructing, based on the optimization scenario, one or more machine learning models;

Method 1700 then proceeds to step 1708 with selecting an optimization algorithm based on the one or more machine learning models; and Method 1700 then proceeds to step 1710 with providing, via the graphical user interface, an optimization output.

In some embodiments, the optimization scenario comprises a structured natural language statement.

In some embodiments, the graphical user interface comprises a plurality of user interface elements, each respective user interface element of the plurality of user interface elements is configured to cause a respective selection element to be displayed within the graphical user interface, and each respective selection element is configured to receive a selection of one of: a location, an optimization target structure, a optimization target variable, an equality constraint, or an inequality constraint.

In some embodiments, the structured natural language statement is created using one or more of the plurality of user interface elements.

Example Processing System

Figure 18:
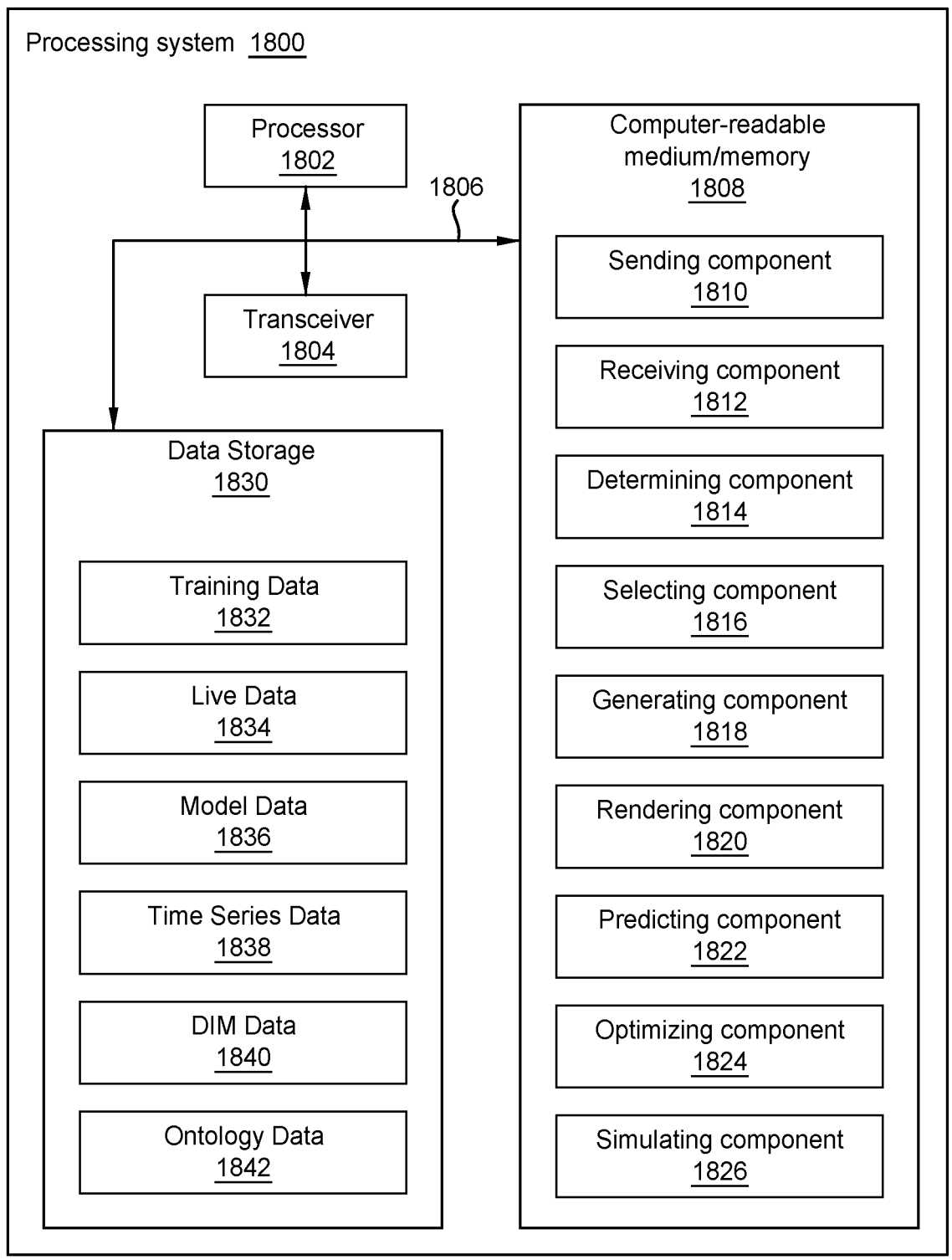
FIG. 18 depicts an example processing system configured to perform the methods described herein.

FIG. 18 depicts an example processing system 1800 configured to perform the methods described herein.

Processing system 1800 includes processor 1802 connected to transceiver 1804, memory 1808, and data storage 1830 by way of bus 1806.

Processor 1802 may be any sort of processor capable of executing instructions and implementing the various components stored in memory 1808. In some implementations, processor 1802 may be representative of multiple processors, including in some implementations multiple different types of processors, such as CPUs, GPUs, DSPs, and other types of processors. In some implementations, processor 1802 may include remote processing components, such as cloud-based processing components.

Transceiver 1804 may be configured for transmitting from and receiving data at processing system 1800, such as from other systems in data communication with processing system 1800.

In this example, memory 1808 (which is a non-transitory computer-readable medium) includes sending component 1810, receiving component 1812, determining component 1814, selecting component 1816, generating component 1818, rendering component 1820, predicting component 1822, optimizing component 1824, and simulating component 1826, which are configured to perform the various aspects of the methods described herein. Other components are possible consistent with the methods described herein.

In this example, data storage 1830 includes training data 1832, live data 1834, model data 1836, time-series data 1838, DIM data 1840, and ontology data 1842. In some embodiments, data storage 1830 may include external data storage repositories, such as cloud-based data storage.

Notably, processing system 1800 is just one example, and many other configurations are possible.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for user-actuated optimization of a built environment scenario, comprising:
   receiving, from a user, an optimization objective associated with a built environment;
   performing semantic problem interpretation based on the optimization objective;
   determining a controlling interval based on the optimization objective;
   performing semantic optimization for the optimization objective including selecting an optimization model associated with one or more optimization variables and consistent with the controlling interval from a plurality of optimization models registered with an ontology server; and
   providing an optimization output to the user.

2. The method of claim 1, wherein performing semantic problem interpretation based on the optimization objective comprises:
   selecting the one or more optimization variables, wherein each optimization variable is associated with the built environment via an domain information model;
   determining one or more constraints;
   determining one or more endogenous variables associated with the built environment; and
   determining one or more exogenous variables associated with the built environment.

3. The method of claim 2, wherein performing semantic problem interpretation based on the optimization objective further comprises:

selecting one or more simulation models associated with the one or more optimization variables from a plurality of simulation models registered with the ontology server; and generating simulation output data based on the one or more simulation models, wherein at least one of the one or more simulation models is a machine learning model.

4. The method of claim 2, wherein performing semantic problem interpretation based on the optimization objective further comprises:

determining no suitable simulation model associated with the one or more optimization variables is registered with the ontology server;

generating one or more machine learning models, wherein an output of each of the one or more machine learning models is associated with at least one of the one or more optimization variables; and generating simulation output data based on the one or more machine learning models.

5. The method of claim 4, wherein generating the one or more machine learning models comprises determining to create one machine learning model with multiple outputs.

6. The method of claim 4, wherein generating the one or more machine learning models comprises determining to a plurality of machine learning models, wherein each machine learning model of the plurality of machine learning models has a single output.

7. The method of claim 1, wherein performing semantic optimization for the optimization objective further comprises:

determining one or more configurations for the selected optimization model;

providing simulation data to the selected optimization model; and generating, via the optimization model, the optimization output.

8. The method of claim 7, wherein the optimization model is a genetic algorithm model.

9. The method of claim 8, wherein selecting the optimization model comprises receiving a selection of the optimization model from the user.

10. The method of claim 9, wherein determining the one or more configurations for the selected optimization model comprises receiving the one or more configurations from the user.

11. The method of claim 1, wherein the optimization objective comprises a structured natural language statement.

12. The method of claim 1, further comprising: transmitting a command to an element of the built environment, the command comprising a setting based on the optimization output.

13. The method of claim 12, wherein:
the element is an HVAC system, and
the setting is a run schedule.

14. A method for providing performance management in a built environment, comprising:

retrieving a semantic domain model of the built environment;

receiving, via a graphical user interface, an optimization scenario comprising one or more optimization features in a natural language format;

constructing, based on the optimization scenario, one or more machine learning models, including selecting, via a variable selection service, one or more of the one or more optimization features required by the optimization scenario;

selecting an optimization algorithm based on the one or more machine learning models; and providing, via the graphical user interface, an optimization output.

15. The method of claim 14, wherein the optimization scenario comprises a structured natural language statement.

16. The method of claim 15, wherein:
the graphical user interface comprises a plurality of user interface elements, each respective user interface element of the plurality of user interface elements is configured to cause a respective selection element to be displayed within the graphical user interface, and each respective selection element is configured to receive a selection of one of:
a location,
an optimization target structure,
a optimization target variable,
an equality constraint, or
an inequality constraint.

17. The method of claim 16, wherein the structured natural language statement is created using one or more of the plurality of user interface elements.

18. The method of claim 14, further comprising:
rendering a three-dimensional model of the built environment in the graphical user interface based on the semantic domain model of the built environment;

receiving, via the graphical user interface, a selection of an element of the three-dimensional model; and rendering, within the graphical user interface, a consumption view comprising consumption data related to the selected element of the three-dimensional model.

19. The method of claim 18, wherein the consumption data relates to one of: an electricity consumption, a water consumption, or a gas consumption.

20. The method of claim 18, further comprising:
rendering, within the graphical user interface, based on the semantic domain model of the built environment, a hierarchical view of the built environment, wherein the hierarchical view includes a plurality of graphical user interface elements each associated with an element in the semantic domain model of the built environment.

* * * * *